(12) United States Patent
Jeon

(10) Patent No.: US 11,091,906 B2
(45) Date of Patent: Aug. 17, 2021

(54) VACUUM INSULATING MATERIAL PROVIDING ASSEMBLY AND VACUUM INSULATING MATERIAL PROVIDING METHOD USING SAME

(71) Applicant: Soon-Bok Jeon, Gyeonggi-do (KR)

(72) Inventor: Soon-Bok Jeon, Gyeonggi-do (KR)

(73) Assignee: Soon-Bok Jeon, Gyeonggi-do (KR)

( * ) Notice: Subject to any disclaimer, the term of this patent is extended or adjusted under 35 U.S.C. 154(b) by 0 days.

(21) Appl. No.: 16/667,437

(22) Filed: Oct. 29, 2019

(65) Prior Publication Data

US 2020/0063430 A1    Feb. 27, 2020

Related U.S. Application Data

(63) Continuation of application No. 15/740,235, filed as application No. PCT/KR2016/006844 on Jun. 27, 2016, now Pat. No. 10,508,433.

(30) Foreign Application Priority Data

| Jul. 2, 2015 | (KR) | 10-2015-0094772 |
| Jul. 21, 2015 | (KR) | 10-2015-0102858 |
| Jul. 31, 2015 | (KR) | 10-2015-0108705 |
| Aug. 6, 2015 | (KR) | 10-2015-0111077 |
| Apr. 8, 2016 | (KR) | 10-2016-0043405 |
| Apr. 14, 2016 | (KR) | 10-2016-0045610 |

(51) Int. Cl.
*E04B 1/41* (2006.01)
*E04B 1/80* (2006.01)
*E04B 1/76* (2006.01)
*E04F 13/08* (2006.01)
*E04B 1/38* (2006.01)

(52) U.S. Cl.
CPC .............. *E04B 1/40* (2013.01); *E04B 1/7629* (2013.01); *E04B 1/7675* (2013.01); *E04B 1/803* (2013.01); *E04B 2001/405* (2013.01); *E04B 2001/7679* (2013.01); *E04F 13/081* (2013.01); *E04F 13/0875* (2013.01); *Y02A 30/242* (2018.01); *Y02B 80/10* (2013.01)

(58) Field of Classification Search
CPC .......... E04B 1/40; E04B 1/803; E04B 1/7675; E04B 1/7629; E04B 2001/7679; E04B 2001/405; Y02B 80/10; Y02A 30/242; E04F 13/0875; E04F 13/081
See application file for complete search history.

(56) References Cited

U.S. PATENT DOCUMENTS 2,567,554 A * 9/1951 Davey .................. F16B 5/0028
33/492
3,192,671 A * 7/1965 Smith ...................... E04B 1/14
52/434

(Continued)

*Primary Examiner* — Adriana Figueroa
(74) *Attorney, Agent, or Firm* — IP & T Group LLP

(57) ABSTRACT

A vacuum insulating material providing assembly, which can be used to provide the vacuum insulating material to the interior corners, exterior corners and/or window edge portions of a building, includes corner members positioned at the interior corners, exterior corners or window edges of the building, wherein the corner member has: a base plate; a first cantilever plate extending from one end of the base plate in the vertical direction; and a second cantilever plate extending from the base plate in the direction parallel to the first cantilever plate.

2 Claims, 17 Drawing Sheets

(56) References Cited

U.S. PATENT DOCUMENTS

| | | | | | |
|---|---|---|---|---|---|
| 3,349,533 | A | * | 10/1967 | Gregoire | E04B 2/7854 52/716.8 |
| D244,382 | S | * | 5/1977 | Scheid | D25/119 |
| 4,047,355 | A | * | 9/1977 | Knorr | E04B 1/941 52/481.1 |
| 4,703,603 | A | * | 11/1987 | Hills | F16B 5/0028 52/582.1 |
| 4,916,882 | A | * | 4/1990 | Brochard | F16B 5/01 52/787.1 |
| 5,343,668 | A | * | 9/1994 | Gonzalez | E04G 21/24 52/712 |
| 5,966,893 | A | * | 10/1999 | Quillin | F16B 5/0028 52/282.2 |
| 6,363,663 | B1 | * | 4/2002 | Kane | E04B 2/7435 52/205 |
| D557,429 | S | * | 12/2007 | Bullock, Jr. | D25/119 |
| 7,900,411 | B2 | * | 3/2011 | Antonic | E06B 3/6621 52/275 |
| 9,140,008 | B2 | * | 9/2015 | Beaty | E04B 2/16 |
| 9,366,040 | B2 | * | 6/2016 | Singh | E04B 1/64 |
| 2008/0236052 | A1 | | 10/2008 | Fleming | |

\* cited by examiner

VACUUM INSULATING MATERIAL PROVIDING ASSEMBLY AND VACUUM INSULATING MATERIAL PROVIDING METHOD USING SAME

CROSS-REFERENCE TO RELATED APPLICATION

This application is a continuation of U.S. patent application Ser. No. 15/740,235 filed on Dec. 27, 2017, which is a national stage application of PCT/KR2016/006844 filed on Jun. 27, 2016, which claims priority of Korean Patent Application No. 10-2015-0094772, filed on Jul. 2, 2015, Korean Patent Application No. 10-2015-0102858, filed on Jul. 21, 2015, Korean Patent Application No. 10-2015-0108705, filed on Jul. 31, 2015, Korean Patent Application No. 10-2015-0111077, filed on Aug. 6, 2015, Korean Patent Application No. 10-2016-0043405, filed on Apr. 8, 2016, and Korean Patent Application No. 10-2016-0045610, filed on Apr. 14, 2016. The disclosure of each of the foregoing applications is incorporated herein by reference in its entirety.

TECHNICAL FIELD

The present invention relates to a vacuum insulating material providing assembly and a vacuum insulating material providing method using the same, which can be used to install a vacuum insulating material in a building.

BACKGROUND

A vacuum insulating material (hereinafter, referred to as 'vacuum insulation panel') is a high-performance insulation panel that uses a low thermal conductivity of vacuum. In recent years, the vacuum insulation panel has been applied to a building that is newly built or rebuilt instead of conventional insulation panels such as styrofoam or urethane. Such a vacuum insulation panel is an insulation panel in which a core material serving as a spacer is inserted into an envelope and then the interior thereof is decompressed and sealed. The vacuum insulation panel is made of a rectangular panel having a certain thickness and has a very low thermal conductivity. An organic core material such as a polyurethane foam or an inorganic core material such as a glass fiber and silica may be used as the core material. While the conventional general is insulation panel has an insulation performance of 0.031 to 0.040(W/mK), the vacuum insulation panel has an excellent insulation performance of 0.0002 to 0.0150(W/mK). The insulation performance of such a vacuum insulation panel is exhibited by maintaining the degree of vacuum. Since insulation performance of the vacuum insulation panel may be significantly deteriorated by the breakage of the vacuum insulation panel, special attention should be paid to insulation of the vacuum insulation panel in the field.

The conventional vacuum insulation panel providing method includes the steps of: indicating attachment positions by using an india ink line or the like in order to fix and attach the vacuum insulation panel mounting fixtures to the inner side walls of the building; fixing the fixtures at the indicated positions; and installing the vacuum insulation panels by using the fixtures, respectively. However, in the case of installing the vacuum insulation panel by the conventional method of installing the vacuum insulation panel, the positions where a plurality of the fixtures are to be attached must be indicated on the side walls of the building, and a plurality of the fixtures must be fixed to the indicated positions, and then a plurality of vacuum insulation panels must be installed one by one using the fixtures attached thereto. Therefore, there is a problem that the construction of the vacuum insulation panel is very inconvenient and the construction period is delayed as much as that. In addition, there is a great demand in the construction industry for universal vacuum insulation panel installation member capable of installing a vacuum insulation panel on an inner corner, an outer corner and/or a window edge of a building, but the development of such a material has not been accomplished yet.

On the other hand, the term "dryvit" means a typical external insulation method which means it is dried quickly. Specifically, the dryvit means that after outer wall of a building is completed mainly by reinforced concrete or masonry (i.e., brick-piling), the outer part is further installed for the purpose of insulation. That is, the dryvit is an external insulation system consisting of insulation panel, adhesive mortar, glass mesh fiber and finishing material. In actual construction sites, the dryvit insulation system may not be used as a whole but only the finishing material may be applied without an insulating layer for simple aesthetics of concrete walls or masonry walls. However, the conventional dryvit construction includes the installation of an insulation panel constituting the insulating layer. First, an insulation panel such as styrofoam is attached to the wall surface, and acrylic type adhesive mortar is applied for securing the adhesive force of the insulation panel. Thereafter, the finishing is completed by attaching the glass mesh fibers having a high tensile strength for the purpose of crack prevention and forming the acrylic resin type finishing material into a coating film having various patterns and textures using a trowel, a spray gun, a roller, a brush or the like. The dryvit outer wall insulation system thus formed has an advantage of being excellent in heat insulation effect, enhancing the insulation efficiency of the room, being easy to construct with a lightweight materials, being economical, and expressing various colors and textures. However, the conventional dryvit insulation system uses a material as Styrofoam which burns easily as an insulation panel, leading to a large fire. Accordingly, there is a great demand in the construction industry for a dryvit process capable of exhibiting excellent fire resistance and heat insulation performance, but the development of such a process has not been accomplished at all.

DISCLOSURE

Technical Problem

The present invention has been made in order to solve the problems of the prior art as described above, it is an object of the present invention to provide a vacuum insulation panel providing assembly capable of easily installing vacuum insulation panel on an inner corner, an outer corner and/or a window edge of a building without breaking.

It is an object of the second embodiment of the present invention to provide the vacuum insulation panel providing assembly capable of quickly and collectively installing the plurality of vacuum insulation panels on the inner side walls of the building without breakage It is an object of the third embodiment of the present invention to provide the vacuum insulation panel providing assembly capable of installing the vacuum insulation panel having excellent fire resistance and heat insulation performance on the outer wall or the ceiling of the building for dryvit construction.

Technical Solution

In the vacuum insulation panel providing assembly according to the first embodiment of the present invention, the vacuum insulating panel providing assembly for installing the vacuum insulation panel on the inner corner, the outer corner or the window edge of a building, the vacuum insulation panel providing assembly may comprise a corner member positioned on the inner corner, the outer corner or the window edge of the building, and the corner member may comprise a base plate; a first cantilever plate extending in a direction perpendicular to one end of the base plate; and a second cantilever plate extending in a direction parallel to the first cantilever plate from the base plate.

The second cantilever plate may comprise an extension extending further by a predetermined length of the cantilever plate.

The vacuum insulation panel providing assembly may comprise a longitudinal member; and an upper guide member and a lower guide member which are positioned on the upper and lower edge of the inner side wall of the building, respectively and support slidably both ends of the longitudinal member. The longitudinal member may comprise a first plate and a second plate extending parallel to each other; a connecting plate connecting the first plate and the second plate; a first partition plate extending from one side of the connecting plate to the outside in the width direction of the first and second plates; and a second partition plate extending from the other side of the connecting plate to the outside in the width direction of the first and second plates.

In addition, the vacuum insulation panel mounting assembly may further comprise a vacuum insulation panel mounting bracket, wherein the vacuum insulation panel mounting bracket may comprise a semicircular outer wall side plate supporting a first surface of the vacuum insulation panel; a semicircular exterior material side plate supporting a second surface of the vacuum insulation panel; and a connection for connecting the outer wall side plate and a straight end of the exterior material side plate along the thickness direction of the vacuum insulation panel.

The connection may comprise a mounting groove extending along the thickness direction of the vacuum insulation panel.

A vacuum insulation panel providing assembly according to the second embodiment of the present invention, the vacuum insulation panel providing assembly for installing a vacuum insulation panel on the inner side wall of the building, wherein the vacuum insulation panel providing assembly may comprise a longitudinal member. The longitudinal member may comprise a first plate and a second plate extending parallel to each other; a connecting plate connecting the first plate and the second plate; a first partition plate extending from one side of the connecting plate to the outside in the width direction of the first and second plates; and a second partition plate extending from the other side of the connecting plate to the outside in the width direction of the first and second plates.

In addition, a vacuum insulation panel providing assembly according to the second embodiment of the present invention, the vacuum insulation panel providing assembly for installing a vacuum insulation panel on an inner side of a building, wherein the vacuum insulation panel providing assembly may comprise a longitudinal member. The longitudinal member may comprise a first plate and a second plate spaced apart from each other with a third plate therebetween and extending parallel to each other; a connecting plate connecting the second plate and the third plate; a pair of first leg plates extending in parallel in a direction perpendicular to the surface of the first plate facing the third plate; a pair of second leg plates extending side by side to each other in a direction perpendicular to the surface of the third plate facing the first plate; and an insulating block positioned between the pair of second leg plates and the pair of second leg plates to block heat transfer from the first plate to the third plate by separating the first plate and the third plate from each other.

Each end of the pair of first leg plates may be formed with a first latching protrusion protruding in a direction in which the pair of first leg plates face each other, and each end of the pair of second leg plates may be formed with a pair of second latching protrusion protruding in a direction in which the pair of second leg plates face each other.

The vacuum insulation panel providing assembly may further comprise an upper guide member and a lower guide member which are positioned on the upper and lower edges of the inner side wall of the building, respectively and support slidably both ends of the longitudinal member, wherein the upper guide member and the lower guide member may each be a bar-shaped member having a '⌐'-shaped cross section.

The vacuum insulation panel providing assembly may further comprise at least one corner member installed on an inner corner of the building, wherein the corner member may comprise a base plate; and a first cantilever plate extending a direction perpendicular to the base plate in parallel; and a second cantilever plate.

The vacuum insulation panel providing assembly may further comprise at least one corner member installed on an inner corner of the building, wherein the corner member may comprise a fourth plate; a pair of third plates extending spaced apart from each other in a direction side by side to the fourth plate; a second connecting plate connecting an end of the fourth plate and each end of the pair of third leg plates; a fifth plate extending in a direction side by side to the fourth plate; a pair of fourth leg plates spaced apart from each other in a direction side by side to the fourth plate; a third connecting plate connecting the end of the fifth plate and each end of the pair of fourth leg plates; and a second insulating block positioned between the pair of third leg plates and the pair of fourth leg plates to block heat transfer from the fourth plate to the fifth plate by separating the fourth plate and the fifth plate from each other.

Each of the other ends of the pair of third leg plates may be formed with third latching protrusions protruding in a direction in which the pair of third leg plates face each other, and each of the other ends of the pair of forth leg plates may be formed with forth latching protrusions protruding in a direction in which the pair of forth leg plates face each other.

A vacuum insulation panel providing assembly, the vacuum insulation panel providing assembly for installing a vacuum insulation panel on an outer wall or a ceiling of a building, wherein vacuum insulation panel providing assembly may comprise a vacuum insulation panel mounting bracket for supporting one end of two adjacent vacuum insulation panels. The vacuum insulation panel mounting bracket may comprise a first plate; a second plate facing the first plate; and a connecting plate connecting the first plate and the second plate to form a first fitting space and a second fitting space.

A vacuum insulation panel providing assembly according to the third embodiment of the present invention, a vacuum insulation panel providing assembly for installing the vacuum insulation panel on an outer wall or ceiling of a building, wherein the vacuum insulation panel providing assembly may comprise a vacuum insulation panel mounting bracket for supporting one end of two adjacent vacuum insulation panels. Wherein the vacuum insulation panel mounting bracket may comprise a first plate; a second plate facing the first plate; a pair of first leg plates extending parallel to each other in a direction perpendicular to the surface of the first plate facing the second plate; a pair of second leg plates extending parallel to each other in a direction perpendicular to the surface of the second plate facing the first plate; and an insulating block positioned between the pair of first leg plates and the pair of second leg plates to block heat transfer from the first plate to the second plate by separating the first plate and the second plate from each other.

Each end of the pair of first leg plates may be formed with first latching protrusions protruding in a direction in which the pair of first leg plates face each other, and each end of the pair of second leg plates may be formed with second latching protrusions protruding in a direction in which the pair of second leg plates face each other.

The vacuum insulation panel mounting bracket may further comprising an insulating cover installed to surround the first plate and blocking heat transfer from the vacuum insulation panel mounting bracket to the building.

The vacuum insulation panel providing assembly may further comprise a vacuum insulation panel mounting corner member for supporting a corner side end of the vacuum insulation panel, wherein the vacuum insulation panel mounting corner member may comprise a base plate; a first cantilever plate extending in a direction perpendicular to one end of the base plate; and a second cantilever plate spaced from the first cantilever plate and extending in a direction parallel to the first cantilever plate from the base plate.

The second cantilever plate may further comprise a fastening portion extending further in the extending direction of the second cantilever plate Advantageous Effects According to the vacuum insulation panel providing assembly and the vacuum insulation panel providing method using the same according to the present invention, it is possible to install easily the vacuum insulation panel on the inner corner, the outer corner and/or the window edge of the building without breakage.

According to the vacuum insulation panel providing assembly of the present invention, the plurality of vacuum insulation panels can be quickly and integrally formed on the inner side wall of the building without breakage, therefore, the construction time of the vacuum insulation panel can be shortened.

According to the vacuum insulation panel providing assembly of the present invention, the vacuum insulation panel can be installed on the outer wall and/or the ceiling of the building without breakage, and the dryvit construction can be performed more easily.

BRIEF DESCRIPTION OF THE DRAWINGS

FIG. 3 is a perspective view of parts of a vacuum insulation panel providing assembly according to the first example of the first embodiment of the present invention.

FIG. 7 is a view of parts of a vacuum insulation panel providing assembly according to the second example of the first embodiment of the present invention.

DETAILED DESCRIPTION

The above objects, features and advantages of the present invention will become more apparent from the following detailed description when read in conjunction with the accompanying drawings. It should be understood that when one part is referred to as being "connected" to another part throughout the specification, even though the one part may be directly connected to the other part, there may be other parts between them. It also should be understood that when one element is referred to as being "comprising" or "having", the one element may include another element, but do not preclude the presence on addition of other element(s), unless the context clearly dictates otherwise.

Hereinafter, preferred embodiments of the present invention will be described with reference to the accompanying drawings.

Figure 1:
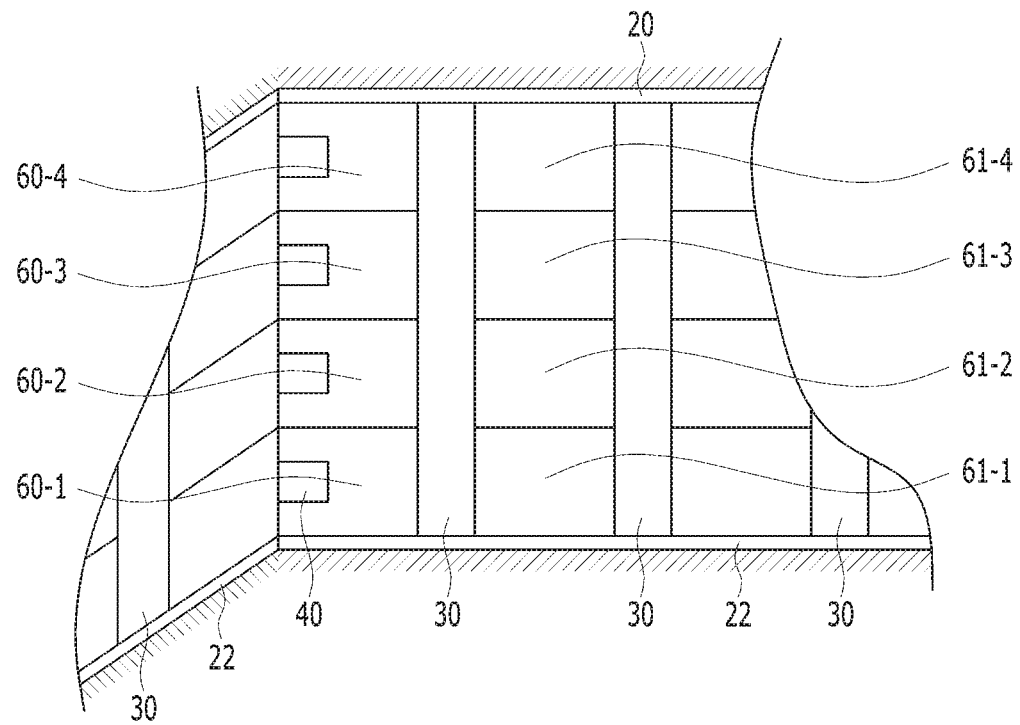
FIG. 1 is a view of a state in which a vacuum insulation panel is installed on an inner corner of a building by using a vacuum insulation panel providing assembly according to the first example of the first embodiment of the present invention, with some of the interior material removed.
Figure 2:
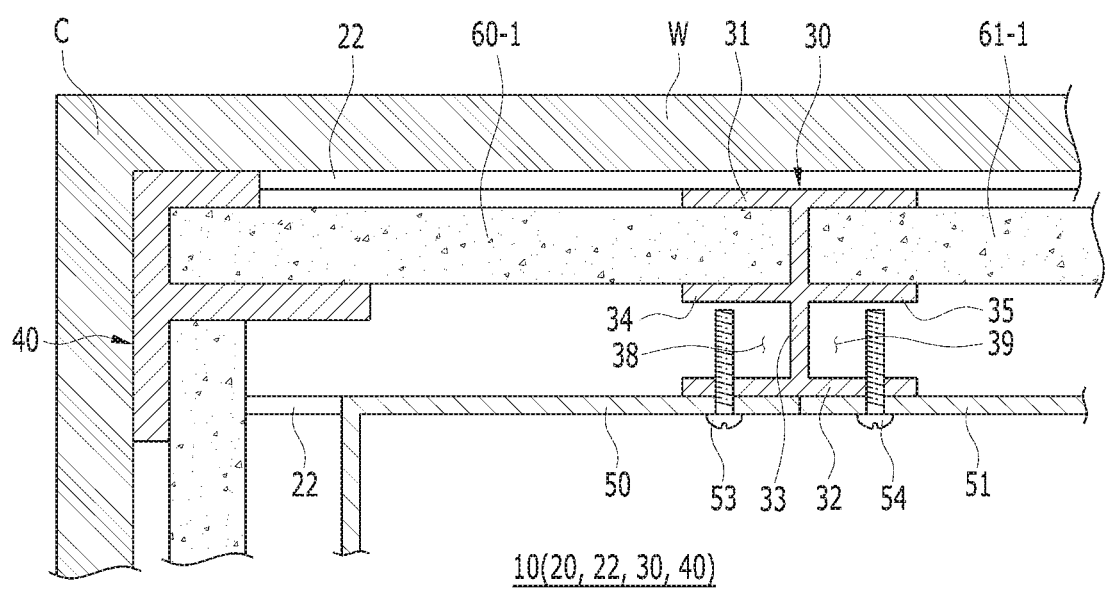
FIG. 2 is a cross-sectional view of a state in which a vacuum insulation panel is installed on an inner corner of a building by using a vacuum insulation panel providing assembly according to the first example of the first embodiment of the present invention
Figure 3A:
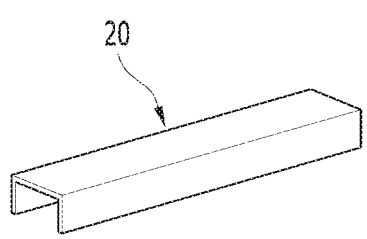
FIG. 3A is a perspective view of an upper guide member.
Figure 3B:
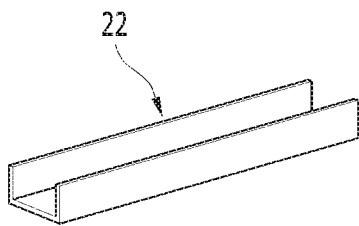
FIG. 3B is a perspective view of a lower guide member.
Figure 3C:
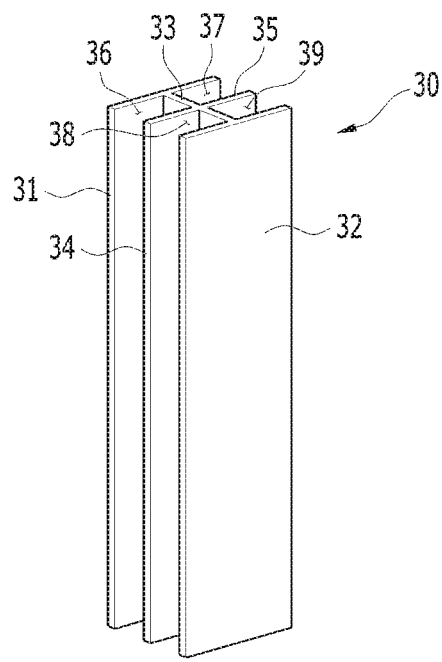
FIG. 3C is a perspective view of a longitudinal member.
Figure 3D:
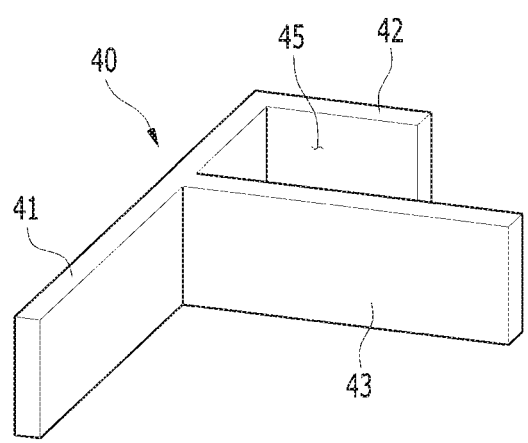
FIG. 3D is a perspective view of a corner member.
Figure 4:
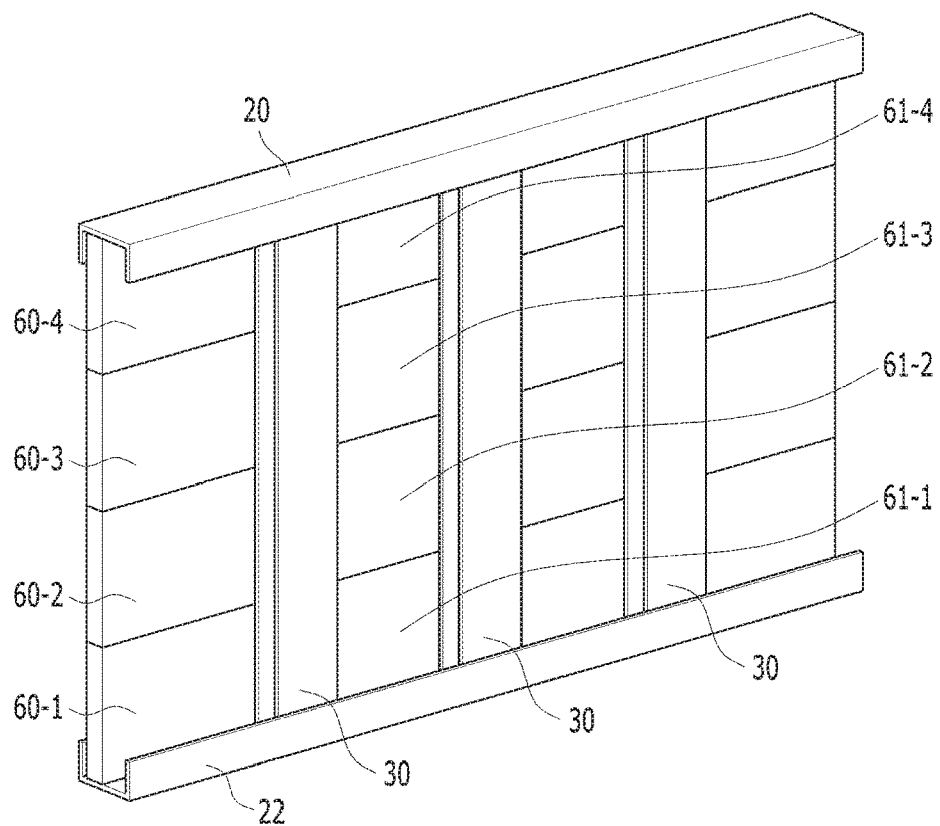
FIG. 4 is a view of a state in which a vacuum insulation panel is installed by using the upper and lower guide members shown in FIGS. 3A and 3B and the longitudinal member shown in FIG. 3C.
Figure 5:
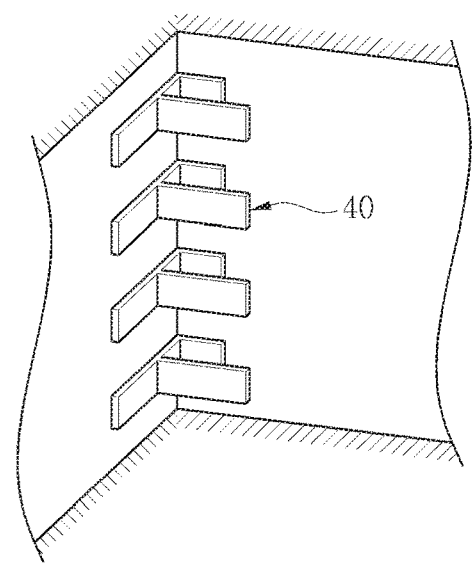
FIG. 5 is a view of a state in which the corner member shown in FIG. 3D is mounted on an inner corner of a building.

Vacuum Insulation Panel Providing Assembly of the First Example of the First Embodiment FIG. 1 is a view of a state in which a vacuum insulation panel is installed on an inner corner of the building by using a vacuum insulation panel providing assembly according to the first example of the first embodiment of the present invention with some of the interior material removed. FIG. 2 is a cross-sectional view of a state in which a vacuum insulation panel is installed on an inner corner of the building by using a vacuum insulation panel providing assembly according to the first example of the first embodiment of the present invention. FIG. 3 is a view of parts of a vacuum insulation panel providing assembly according to the first example of the first embodiment of the present invention. FIG. 3A is a perspective view of an upper guide member, FIG. 3B is a perspective view of a lower guide member, FIG. 3C is a perspective view of a longitudinal member, and FIG. 3D is a perspective view of a corner member. FIG. 4 is a view of a state in which a vacuum insulation panel is installed by using the upper and lower guide members shown in FIGS. 3A and 3B and the longitudinal member shown in FIG. 3C. FIG. 5 is a view of a state in which the corner member shown in FIG. 3D is mounted on an inner corner of the building.

Referring to FIGS. 1 to 3, a vacuum insulation panel providing assembly 10 according to the first example of the first embodiment of the present invention may comprise an upper guide member 20, a lower guide member 22, a longitudinal member 30, and a corner member 40.

The upper guide member 20 is a bar-shaped member having an approximately '⌐'-shaped cross section. The upper guide member 20 is fastened to the ceiling slab of the building by using a fastening member such as a nail or a bolt and is located on the upper edge portion of the inner side wall W of the building.

Like the upper guide member 20, the lower guide member 22 is a bar-shaped member having an approximately '⌐'-shaped cross section and fixed to the bottom surface of the building by using a fastening member such as a nail or a bolt and is located at the lower edge portion of the inner side wall W of the building.

The upper and lower guide members 20 and 22 are positioned at the upper and lower edge portions of the inner side wall W of the building, respectively and support slidably both end portions of the longitudinal member 30 to be described later, so that the longitudinal member 30 can slide along the longitudinal direction of the guide members 20, 22.

The longitudinal member 30 comprises first and second plates 31 and 32 extending in the vertical direction; connecting plate 33 connecting the first plate 31 and the second plate 32; and first and second partition plates 34 and 35 extending from both sides of the first and second plates 31 and 32 to the outside in the width direction of the first and second plates 31 and 32, respectively.

The longitudinal member 30 has an approximately 'ᴣ'-shaped cross section and is divided into four spaces. Specifically, a first fitting place 36 in which one end of the set of vacuum insulation panels 60-1, 60-2, 60-3 and 60-4 is installed by fitting it and a first accommodating space 38 for accommodating fasteners 53 and 54 such as nails and bolts for fastening the interior materials 50 and 51 to the second plate 32 are partitioned by the first compartment plate 34. The second fitting place 37 in which one end of the other set of vacuum insulation panels 61-1, 61-2, 61-3 and 61-4 is installed by fitting it and the second accommodating space 39 for accommodating fasteners 53 and 54 for fastening the interior materials 50 and 51 to the second plate 32 are partitioned by the second partition plate 35.

The first and second partition plates 34 and 35 may support the ends of the set of vacuum insulation panels 60-1, 60-2, 60-3, 60-4, 61-1, 61-2, 61-3 and 61-4 by partitioning the first and second fitting spaces 36 and 37, respectively. By partitioning the first and second accommodating spaces 38 and 39, it is possible to prevent the vacuum insulation panel from being damaged by the fasteners 53, 54 such as nails and bolts used for fixing the inner material 51 to the second plate 32 and deterioration of the heat insulation performance.

As shown in FIGS. 1 and 4, in the first and second fitting spaces 36 and 37, the sets of four vacuum insulation panels 60-1, 60-2, 60-3, 60-4, 61-1, 61-2, 61-3 and 61-4 are installed by fitting them into the vertical direction, respectively. However, the present invention is not limited thereto, and less than or equal to three (3), or more than or equal to five (5) sets of vacuum insulation panel may be fitted.

The corner member 40 comprises a base plate 41; and first and second cantilever plates 42 and 43 extending in a direction perpendicular to the base plate 41. Therefore, the corner member 40 has an approximately 'F'-shaped cross section. The first cantilever plate 42 and the second cantilever plate 43 are separated from each other by a distance corresponding to the thickness of the vacuum insulation panel, so that one end of the vacuum insulation panel may be installed by fitting it and supported in the fitting space 45 between the first and second cantilever plates 42 and 43. One end of any vacuum insulation panel may be supported by the right angled side of the base plate 41 and the second cantilever plate 43.

The corner members 40 for installing the vacuum insulation panel may be arranged at equal intervals in the vertical direction by four pieces for each inner corner C of the building, and may be fixed by fastening the base plate to the inner corner C of the building by a fastening member such as nail or bolt or the like. Therefore, the set of vacuum insulation panels 60-1, 60-2, 60-3 and 60-4 may be installed by fitting it into the fitting spaces 45 of the four corner members 40, respectively. In the present embodiment, the four corner members 40 are installed by fixing them at each inner corner C of the building. However, the present invention is not limited hereto, and less than or equal to three (3), or more than or equal to five (5) corner members 40 may be fixed to each inner corner C of the building.

Figure 6:
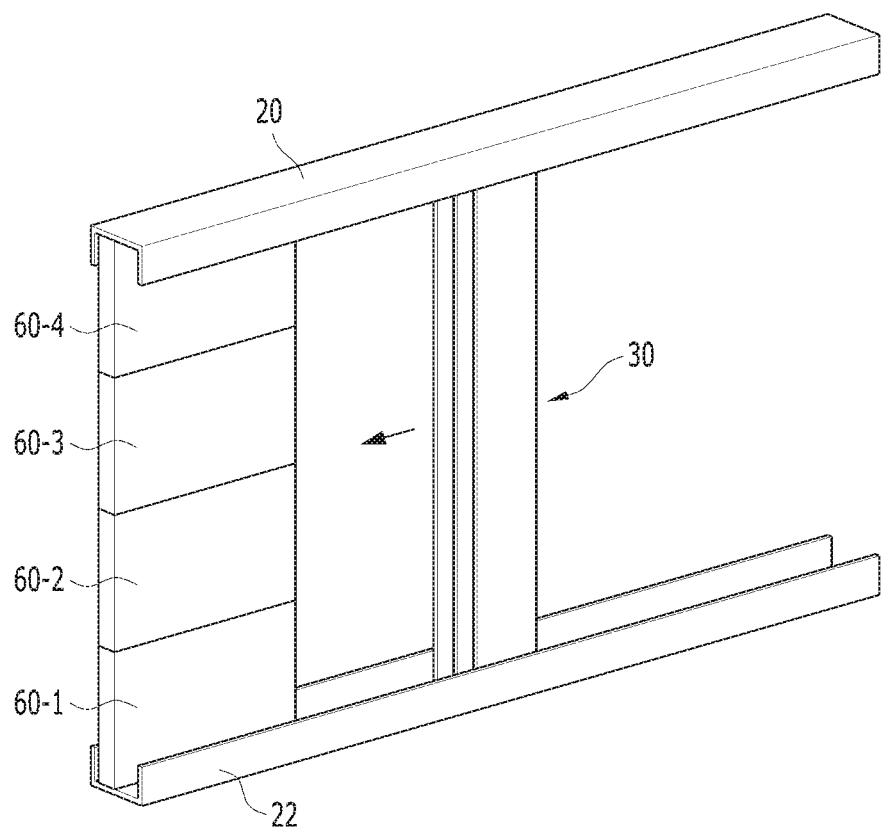
FIG. 6 is a view of a process of collectively installing a vacuum insulation panel as a set by using a vacuum insulation panel providing assembly according to the first example of the first embodiment of the present invention.

Referring to FIGS. 5 and 6, a process of collectively installing the vacuum insulation panel on the inner side wall W of the building as a set by using the vacuum insulation panel providing assembly according to the first embodiment of the present invention will be described.

The corner member 40 is positioned at the inner corner C of the building by fastening the base plate 41 to the inner corner C of the building by using a fastening member such as a nail or a bolt. At this time, the corner member 40 may be fixed to the inner corners C of the building at equal intervals by four in the vertical direction.

The upper and lower guide members 20 and 22 are fastened to the upper and lower edge portions of the building by using fastening members such as nails or bolts, so that the upper and lower guide members 20 and 22 are positioned at the upper and lower edges of the budding, respectively.

The longitudinal member 30 may be installed by raising upright between the upper and lower guide members 20 and 22, so that the longitudinal member 30 can movable slidably along the longitudinal direction of the guide members 20 and 22.

The builder may install one end of the set of four vacuum insulation panels 60-1, 60-2, 60-3 and 60-4 by fitting them into the fitting space 45 of the four corner members 40 in turn. Thereafter, by sliding the longitudinal member 30 in the direction of the arrow in FIG. 6, the builder may install the other end of the set of vacuum insulation panels 60-1, 60-2, 60-3 and 60-4 by fitting them into the first fitting space 36 of the longitudinal member 30. After that, the builder may insert the other set of four vacuum insulation panels 61-1, 61-2, 61-3 and 61-4 into the second fitting space 37 of the longitudinal member 30. Thereafter, by sliding the other longitudinal member 30, the builder may install the other end of the other set of vacuum insulation panels 61-1, 61-2, 61-3 and 61-4 by fitting them into the first fitting space 36 of the other longitudinal member 30. In this manner, the builder may collectively install the four vacuum insulation panels on the inner wall side W of the building by each set, thereby greatly improving the vacuum insulation panel assembling efficiency.

Vacuum Insulation Panel Providing Assembly of the Second Example of the First Embodiment In describing the second example of the first embodiment of the present invention, the same parts having the same functions as those of the first example are denoted by the same reference numerals, so that unnecessary redundant explanation will be avoided, and differences will be mainly discussed.

Figure 8:
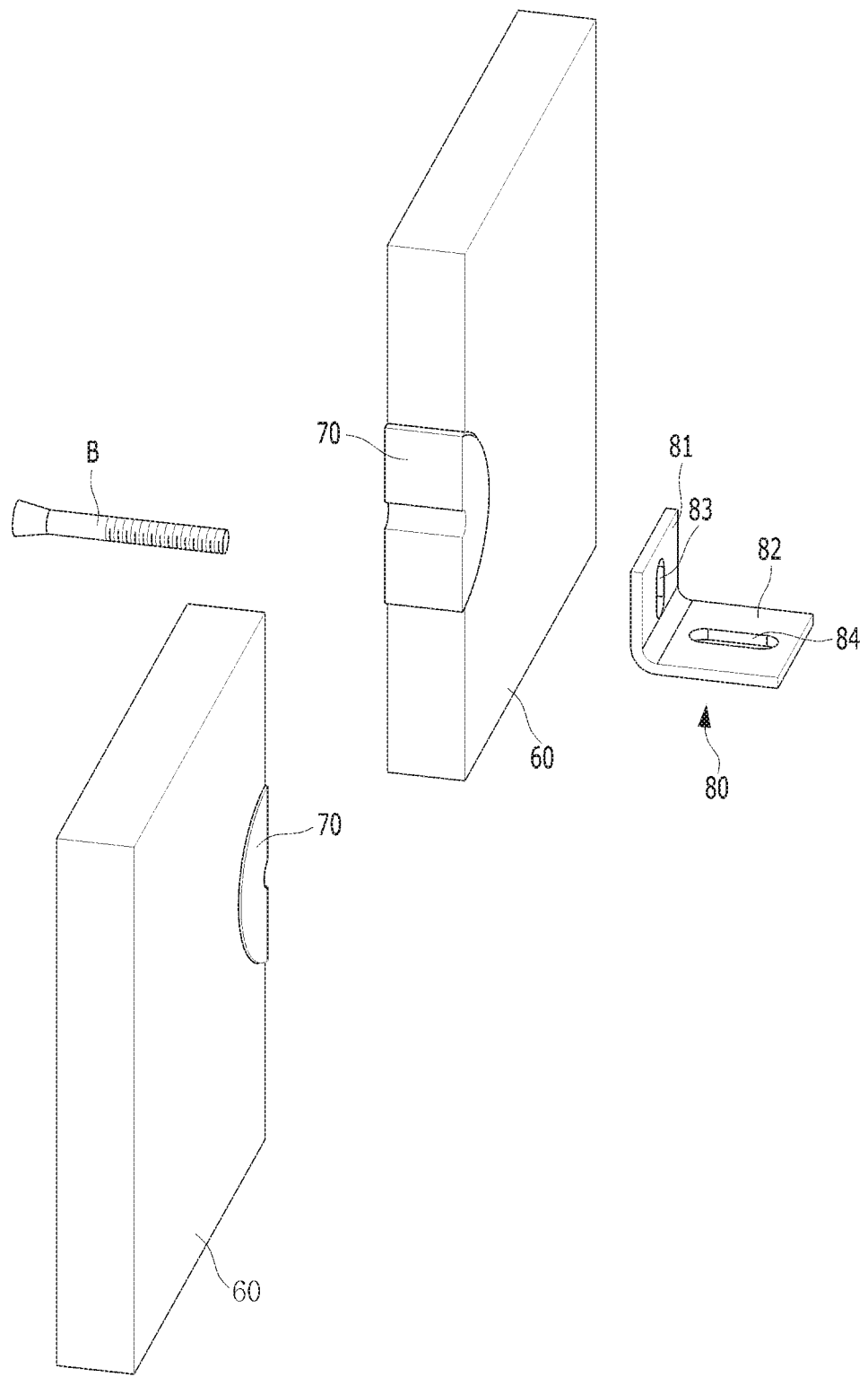
FIG. 8 is a perspective view of an exploded view of a vacuum insulation panel mounting bracket shown in FIGS. 7A and 7B, and an exterior material mounting bracket shown in FIG. 7C.
Figure 9:
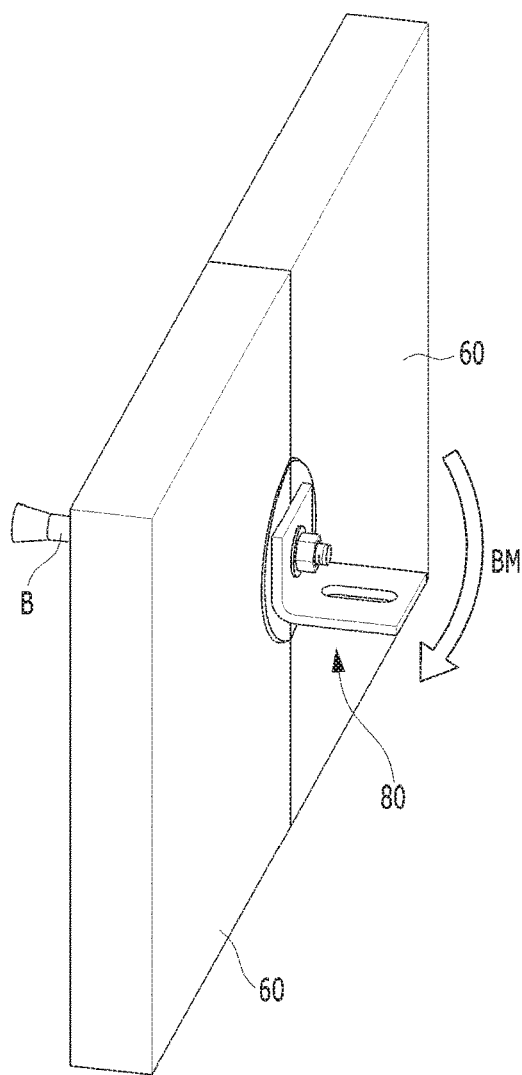
FIG. 9 is a perspective view of a state in which a vacuum insulation panel mounting bracket shown in FIGS. 7A and 7B, and an exterior material mounting bracket shown in FIG. 7C are assembled.
Figure 10:
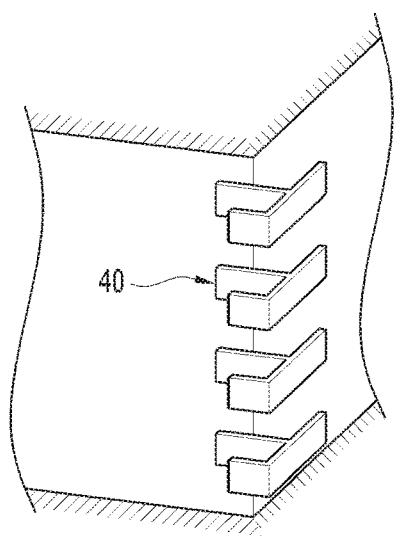
FIG. 10 is a view of a state in which a corner member of vacuum insulation panel providing assembly according to the second example of the first embodiment of the present invention is mounted on an outer corner of a building.
Figure 11:
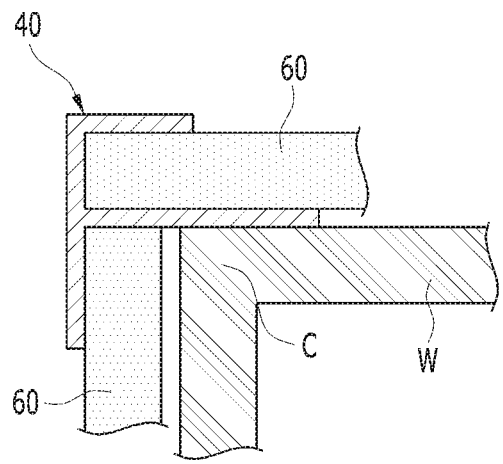
FIG. 11 is a cross-sectional view of a state in which a corner member of a vacuum insulation panel providing assembly is installed on an outer corner of a building in the second example of the first embodiment of the present invention.

FIG. 7 is a view of parts of a vacuum insulation panel providing assembly according to the second example of the first embodiment of the present invention. FIG. 7A is a perspective view of a vacuum insulation panel mounting bracket seen from one side. FIG. 7B is a perspective view of a vacuum insulation panel mounting bracket seen from the other side, FIG. 7C is a perspective view of an exterior material mounting bracket, and FIG. 7D is a perspective view of a corner member. FIG. 8 is a perspective view of an exploded view of a vacuum insulation panel mounting bracket shown in FIGS. 7A and 7B, and an exterior material mounting bracket shown in FIG. 7C. FIG. 9 is a perspective view of a state in which a vacuum insulation panel mounting bracket shown in FIGS. 7A and 7B, and an exterior material mounting bracket shown in FIG. 7C is assembled. FIG. 10 is a view of a state in which a corner member of vacuum insulation panel providing assembly according to the second example of the first embodiment of the present invention is mounted on an outer corner of the building. FIG. 11 is a cross-sectional view of a state in which a corner member of a vacuum insulation panel providing assembly is installed on an outer corner of a building in the second example of the first embodiment of the present invention.

Figure 7A:
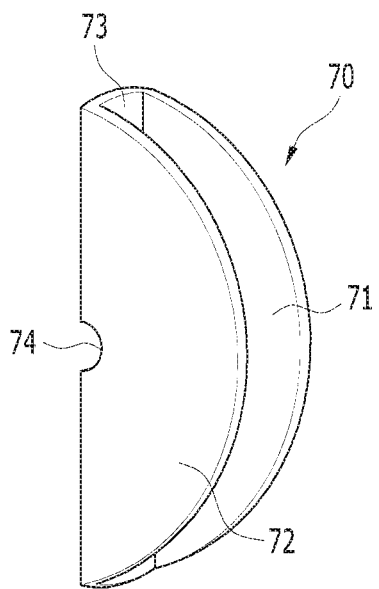
FIG. 7A is a perspective view of a vacuum insulation panel mounting bracket seen from one side.
Figure 7B:
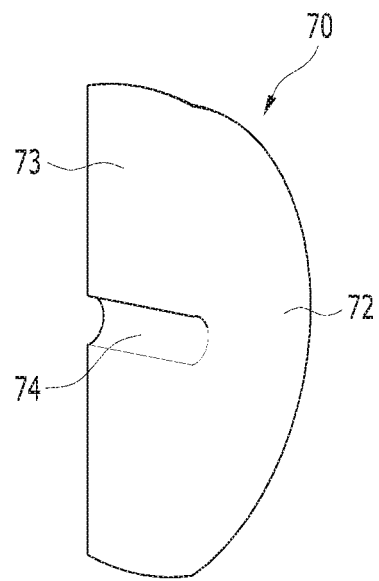
FIG. 7B is a perspective view of a vacuum insulation panel mounting bracket seen from the other side.

Referring to FIGS. 7A and 7B, the vacuum insulation panel mounting bracket 70 comprises an outer wall side plate 71; an exterior material side plate 72; and a connection 73.

The outer wall side plate 71 is a component for supporting the first surface of the vacuum insulation panel 60, and forming a gap between the vacuum insulation panel 60 and the outer wall side W of the building. Since there is such a gap, the vacuum insulation panel 60 and the outer wall of the building may not directly contact each other. Thus, it is possible to prevent the vacuum insulation panel 60 from being broken and the vacuum break phenomenon to occur in advance.

The exterior material side plate 72 is a component that supports a second surface opposite to the first surface of the vacuum is insulation panel 60 on one side and abuts on an exterior material mounting bracket 80 to be described later on the other side.

The outer wall side and exterior material side plate 71 and 72 are positioned parallel to each other by a distance corresponding to the thickness of the vacuum insulation panel in the thickness direction of the vacuum insulation panel 60. At this time, it is preferable that the outer wall side and the exterior material side plates 71 and 72 are formed of a plate of a semicircular disk shape.

The connection 73 is a component connecting the straight ends of the outer wall side plate 71 and the exterior material side plate 72 in the thickness direction of the vacuum insulation panel 60. A mounting groove 74 extending in the thickness direction of the vacuum insulation panel 60 is formed at the central part of the connection 73 so as to be caught by and fitted to the anchor bolt B.

The vacuum insulation panel mounting brackets 70 may be fastened by fitting them into to the left and right edges and/or the upper and lower parts of the single vacuum insulation panel 60.

Figure 7C:
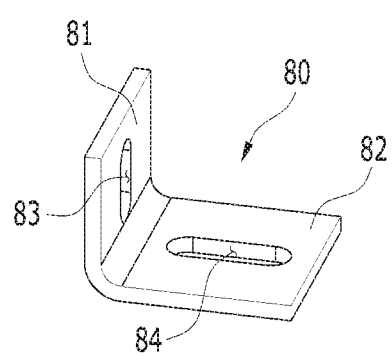
FIG. 7C is a perspective view of exterior material mounting bracket.

As shown in FIG. 7C, the exterior material mounting bracket 80 is an "L"-shaped component for supporting exterior material such as a stone and includes a vertical part 81 and a horizontal part 82.

A vertical elongated hole 83 extending in the vertical direction is formed in the vertical part 81. Anchor bolts B is inserted through the vertical elongated hole 83. The exterior material mounting bracket 80 may be moved in the vertical direction with respect to the anchor bolt B though the vertical elongated hole 83, so that the exterior material mounting bracket 80 can be finely adjusted in the vertical direction A horizontal elongated hole 84 extending in the horizontal direction is formed in the horizontal part 82. The exterior material mounting pin is inserted through the horizontal elongated hole 84 and it is engaged with the exterior material by male/female type connection. The exterior material may be moved in the horizontal direction through the horizontal elongated hole 84. As a result, the exterior material can be finely adjusted in the horizontal direction.

Therefore, it is possible to compensate for the manufacturing error of the exterior material provided on the exterior material mounting bracket 80 through the fine positioning in the vertical direction and/or the horizontal direction.

As shown in FIG. 9, the bending moment BM generated by the weight of the exterior material is transmitted to the vacuum insulation panel mounting bracket 70 through the exterior material mounting bracket 80 when the exterior material mounting bracket 80 is provided with the exterior material. At this time, the bending moment BM transmitted to the vacuum insulation panel mounting bracket 70 is transmitted only to the outer side wall W of the building via the connection 73 and is not transmitted to the exterior material side plate 72 at all. Therefore, the bending moment BM directly acts on the exterior material side plate 72 to deform the exterior material side is plate 72, so that the vacuum insulation panel 60 is not broken at all. Further, as shown in FIG. 9, since the two connections 72 may support the exterior material mounting bracket 80, it is possible to support stably the exterior material mounting bracket 80 even when a high weight exterior material such as a stone or the like is installed.

Figure 7D:
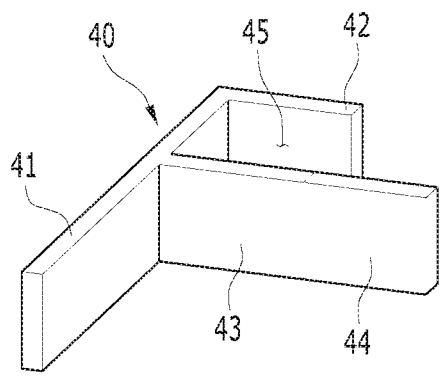
FIG. 7D is a perspective view of a corner member.

As shown in FIG. 7D, the corner member 40 according to the second example of the first embodiment of the present invention comprises a base plate 41; and first and second cantilever plates 42 and 43 extending in a direction perpendicular to the base plate 41 in parallel. Therefore, the corner member 40 has an approximately "F"-shaped cross section. At this time, the second cantilever plate 43 has an extension 44 that extends further outward by a predetermined length than the length of the first cantilever plate 42. The corner member 40 may be fixed to the outer corner C of the building by fastening the extension 44 with a fastening member such as a nail or a bolt in a state where the extending part 44 is positioned at the outer corner C of the building.

A process for assembling the vacuum insulation panel on the outer wall of the building by using the vacuum insulation panel providing assembly according to the second example of the first embodiment of the present invention will be described as follows.

The extension 44 of the second cantilever plate 43 is fastened to the outer corner C of the building by using a fastening member such as a nail or a bolt so that the corner member 40 is positioned on the outer corner C of the building. At this time, four corner members 40 may be fixed to the outer corners C of the building at equal intervals in the vertical direction.

The anchor bolt B is inserted into and fixed to the outer side wall W of the building as a component for supporting the vacuum insulation panel mounting bracket 70 and the exterior material mounting bracket 80.

At least one vacuum insulation panel mounting bracket 70 may be installed on each edge of the vacuum insulation panel 60. Therefore, the edge of the vacuum insulation panel 60 without the vacuum insulation panel mounting bracket 70 may be fitted and held in the fitting space 45 of the corner member 40. And the edge of the vacuum insulation panel 60 provided with the vacuum insulation panel mounting bracket 70 may be supported by the anchor bolt B being caught by the seating groove 74 of the vacuum insulation panel mounting bracket 70.

In this manner, the builder can install easily the vacuum insulation panel on the outer side wall of the building without breakage.

Figure 12:
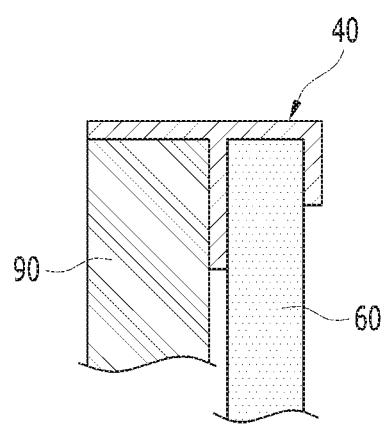
FIG. 12 is a sectional view of a corner member of the vacuum insulation panel providing assembly according to the third example of the first embodiment of the present invention mounted on a window frame.

Vacuum Insulation Panel Providing Assembly of the Third Example of the First Embodiment FIG. 12 is a sectional view of the corner member of the vacuum insulation panel providing assembly according to the third example of the first embodiment of the present invention mounted on a window frame.

Referring to FIG. 12, the third example of the first embodiment of the present invention will be described. The corner member 40 can be applied to the portion of the window frame 90 as shown in FIG. 12. Specifically, in a state in which one end of vacuum insulation panel 60 is fitted in the fitting place 45 between the first and second cantilever plate 42 and 43, the base plate 41 may be fixed to the edge 90 of the window by using a fastening member such as a nail or a bolt. Therefore, the corner member 40 protects the vacuum insulation panel 60 located on the window frame 90, and can prevent the vacuum insulation panel 60 from being damaged.

Vacuum Insulation Panel Providing Method of First Embodiment

Now, a vacuum insulation panel providing method will be described with reference to a flowchart of the vacuum insulation panel providing method shown in FIG. 13.

Figure 13:
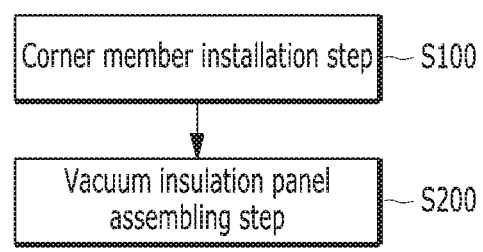
FIG. 13 is a flowchart of vacuum insulation panel providing method using the vacuum insulation panel providing assembly according to the first embodiment of the present invention.

Referring to FIG. 13, the vacuum insulation panel providing method according to the present invention comprises a corner member installation step S100; and a vacuum insulation panel assembling step S200

A corner member installation step S100 is a step of fixing the corner member 40 having the base plate 41 and the first and second cantilever plates 42 and 43 extending in a direction perpendicular to the base plate to an inner corner, an outer corner, and/or a window edge of the building.

Specifically, when fixing the corner member 40 to the inner corner of the building, the base plate 41 of the corner member 40 is fastened to the inner corner of the building by using a fastening member such as a nail or a bolt. On the other hand, when fixing the corner member 40 to the outer corner of the building, the extension 44 of the corner member 40 is fastened to the outer corner of the building by using a fastening member such as a nail or a bolt. On the other hand, when fixing the corner member 40 to the window frame, the base plate 41 of the corner member 40 is fastened to the window by using a fastening member.

A vacuum insulation panel assembling step S200 is a step of installing the vacuum insulation panel by fitting it into the fitting space 45 of the corner member 40.

When the vacuum insulation panel is installed on the inner side wall of the building, the vacuum insulation panel assembling step S200 may include a guide member installation step, a longitudinal member installation step, and a vacuum insulation panel installation step.

The guide member installation step is a step of installing by fixing the upper and lower guide members 20 and 22 having a bar-shaped having a '⊏'-shaped cross section and positioning the upper and lower guide members 20 and 22 on the upper and lower edges of the building.

The longitudinal member installation step is a step of vertically standing the first and second plates 31 and 32 extending in the vertical direction and the connecting plate 33 connecting the first plate 31 and the second plate 32 and the longitudinal members 30 including first and second partition plate 34 and 35 extending from both sides of the connecting plate 33 toward the outside in the width direction of the first and second plates 31 and 32 between the upper and lower guide members 20, 22. Specifically, the vertical member 30 may be installed between the upper and lower guide member 20 and 22 in a state in which the vertical member 30 is tilted by a predetermined angle and then vertically stood and can be guided slidably along the longitudinal direction by the upper and lower guide members 20 and 22.

In the step of installing the vacuum insulation panel installation step, one end of each of the set of four vacuum insulation panels 60-1, 60-2, 60-3 and 60-4 is installed by fitting it into the fitting space 45 of the four corner members 40, then the longitudinal member 30 is moved slidably along the longitudinal direction of the guide members 20, 22, so that the other end of the set of vacuum insulation panels 60-1, 60-2, 60-3 and 60-4 is fitted in the first fitting space 36 of the longitudinal member 30, so that the four vacuum insulation panels are assembled integrally as a set. The vacuum insulation panel installation step includes a series of subsequent step in which one end of the other set of vacuum insulation panels 61-1, 61-2, 61-3 and 61-4 is installed by fitting it into the second fitting space 37 of the longitudinal member 30, then the other longitudinal members 30 are moved slidably along the longitudinal direction of the guide members 20,22, and the other end of the other set of vacuum insulation panels 61-1, 61-2, 61-3 and 61-4 is installed by fitting it into the first fitting space 36 of the other longitudinal member 30.

Meanwhile, when the vacuum insulation panel is installed on the outer side wall of the building, the vacuum insulation panel assembling step S200 may include the anchor bolt fixing step; the vacuum insulation panel mounting bracket fastening step; and the vacuum insulation panel fastening step.

The anchor bolt fixing step is a step of fixing the anchor bolt B to the installation position indicated on the side wall of the building, the ceiling slab, or the like. To this end, the builder drills a hole in the marked installation position by using a drill tool or the like, and then fixes the anchor bolt B to the building firmly by fixing and wedging the head part of the anchor bolt B together with the wedge sleeve inside the hole.

The step of fastening the vacuum insulation panel mounting bracket is a step of fastening at least one vacuum insulation panel mounting bracket 70 to the left and right and/or top and bottom edges of the vacuum insulation panel.

The step of fastening the vacuum insulation panel is a step of fastening the vacuum insulation panel to the building by hanging and fitting it into the anchor bolt B through the mounting groove 74 of the vacuum insulation panel mounting bracket 70 provided in the vacuum insulation panel.

As described in detail above with reference to the preferred embodiments of the present invention, the corner member 40 according to the present invention can be applied to an inner corner, and an outer corner and/or a window frame of the building. Accordingly, the vacuum insulation panel can be installed easily without breakage.

Vacuum Insulation Panel Providing Assembly of the Second Embodiment

Figure 14:
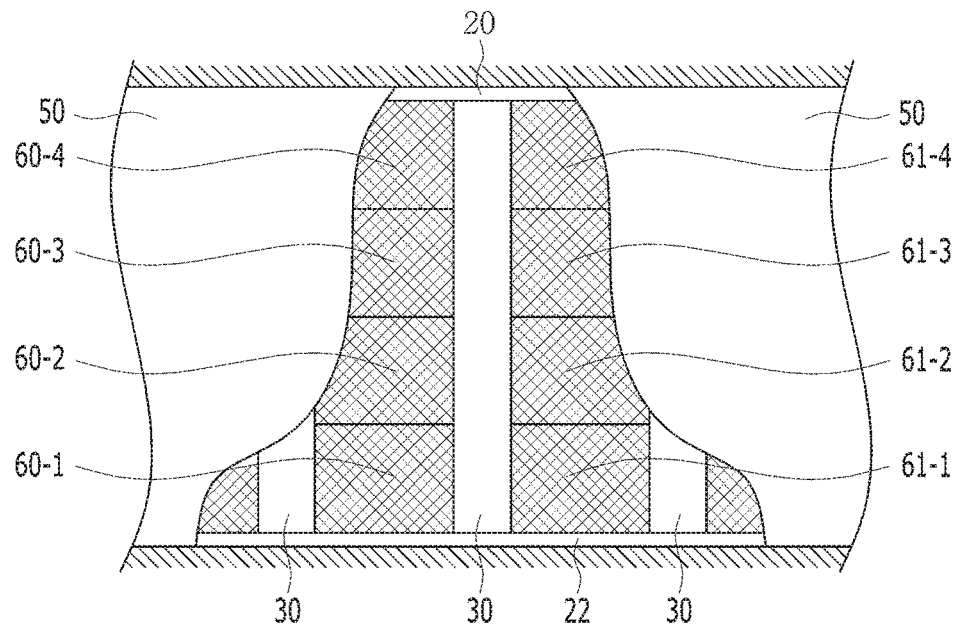
FIG. 14 is a view of a state in which a vacuum insulation panel is installed on an inner side wall of a building by using a vacuum insulation panel providing assembly according to the second embodiment of the present invention with some of the exterior material removed.
Figure 15:
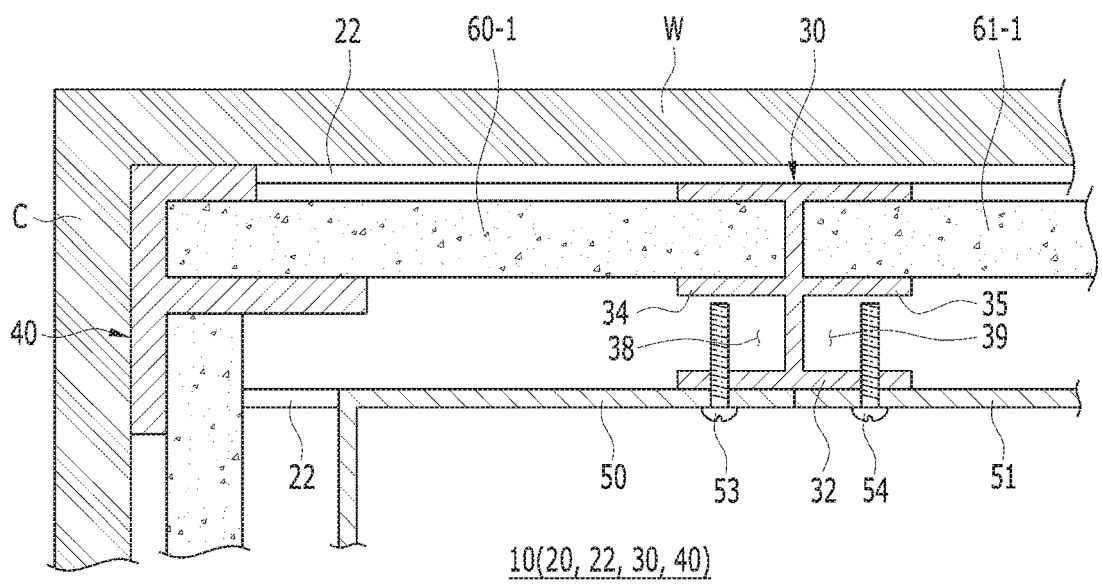
FIG. 15 is a cross-sectional view of a state in which a vacuum insulation panel is installed by using a vacuum insulation panel providing assembly according to the second embodiment of the present invention.
Figure 16:
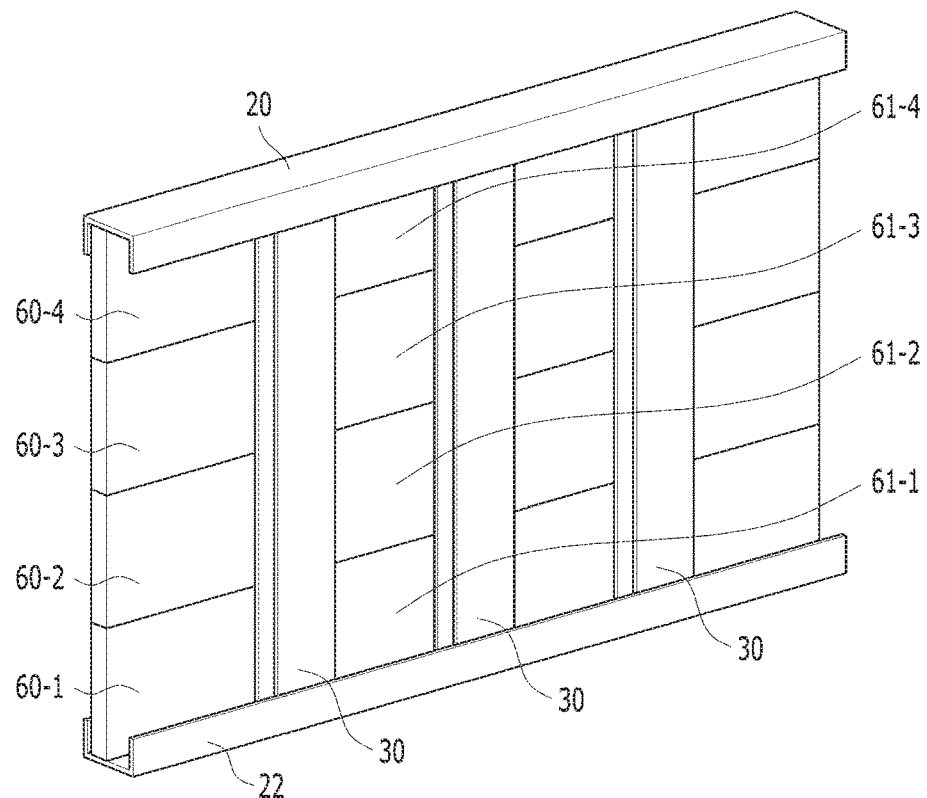
FIG. 16 is a perspective view of a state in which the vacuum insulation panel is installed by using a vacuum insulation panel providing assembly according to the second embodiment of the present invention.

FIG. 14 is a view of a state in which a vacuum insulation panel is installed on an inner side wall of a building by using a vacuum insulation panel providing assembly according to the second embodiment of the present invention with some of the exterior material removed. FIG. 15 is a cross-sectional view of a state in which a vacuum insulation panel is installed by using a vacuum insulation panel providing assembly according to the second embodiment of the present invention. FIG. 16 is a perspective view of a state in which the vacuum insulation panel is installed by using a vacuum insulation panel providing assembly according to the second embodiment of the present invention.

Referring to FIGS. 14 to 16, the vacuum insulation panel providing assembly 10 according to the second embodiment of the present invention includes upper and lower guide members 20 and 22, a longitudinal member 30, and a corner member 40.

As shown in FIG. 2, the upper guide member 20 is a bar-shaped member having an approximately '⊏'-shaped cross section and is fastened to a ceiling slab of the building by using a fastener such as a nail or a bolt and is located at the upper edge of the inner side wall W of the building.

Like the upper guide member 20, the lower guide member 22 is a bar-shaped member having an approximately '⌐'-shaped cross section and is fixed to the bottom surface of the building by using a fastener, and is located at the bottom edge of the side wall W.

The upper and lower guide members 20 and 22 are positioned at the upper and lower edges of the inner side wall W of the building so as to support slidably both ends of the longitudinal member 30, respectively. Thus, the upper and lower guide members 20 and 22 guide the longitudinal member 30 to slide along the longitudinal direction of the guide members 20 and 22.

Figure 17:
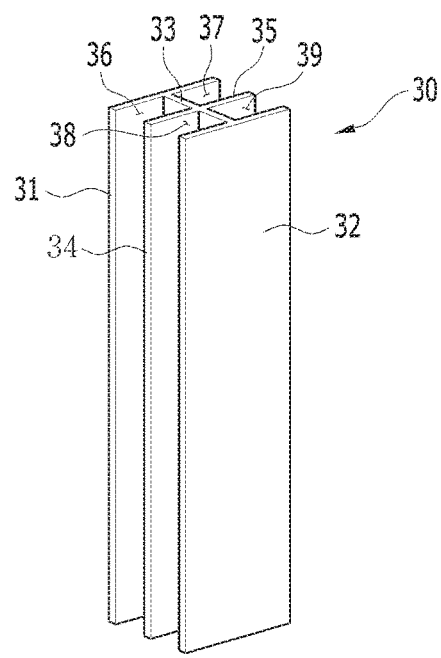
FIG. 17 is a perspective view of a longitudinal member of a vacuum insulation panel providing assembly according to the first example of the second embodiment of the present invention.

FIG. 17 is a perspective view of a longitudinal member of the vacuum insulation panel providing assembly according to the first example of the second embodiment of the present invention.

Referring to FIG. 17, the vertical member 30 of the vacuum insulation panel providing assembly 10 comprises first and second plates 31 and 32 extending in parallel to each other in the vertical direction; a connecting plate 33 connecting the first plate 31; and the second plate 32 and first and second partition plates 34 and 35 extending from both sides of the connecting plate 33 to the outside in the width direction of the first and second plates 31 and 32, respectively.

The longitudinal members 30 have an approximately '干'-shaped cross section and are all divided into four spaces. Specifically, the first accommodating space 38 for accommodating the fastening member 53 for fastening the first fitting space 36 in which one end of the set of vacuum insulation panels 60-1, 60-2, 60-3 and 60-4, and the interior material 50 to the second plate 32 is partitioned by the first partition plate 34. The second accommodating space 39 for accommodating the fastening member 54 for fastening the second fitting space 37 installed by fitting one end of the other set of vacuum insulating members 61-1, 61-2, 61-3 and 61-4, and the other interior material 51 to the second plate 32 is partitioned by the second partition plate 35.

The first and second partition plates 34, 35 partition the first and second fitting spaces 36 and 37, so that one end of the set of vacuum insulation panels 60-1, 60-2, 60-3, 60-4, 61-1, 61-2, 61-3 and 61-4 is supported. On the other hand, by partitioning the first and second accommodating spates 38, 39, it is possible to prevent the vacuum insulation panel from being damaged by the fastening members 53, 54 such as nails and bolts used for fixing the interior materials 50, 51 to the second plate 32 and deterioration of the heat insulation performance in advance.

As shown in FIGS. 1 and 3, the first and second fitting spaces 36 and 37 are provided with the set of four vacuum insulation panels 60-1, 60-2, 60-3, 60-4, 61-1, 61-2, 61-3 and 61-4 which are fitted, but this is merely an example, and the present invention is not limited thereto. The set of vacuum insulation panels may less than or equal to three (3), or more than or equal to five (5), respectively.

Figure 18:
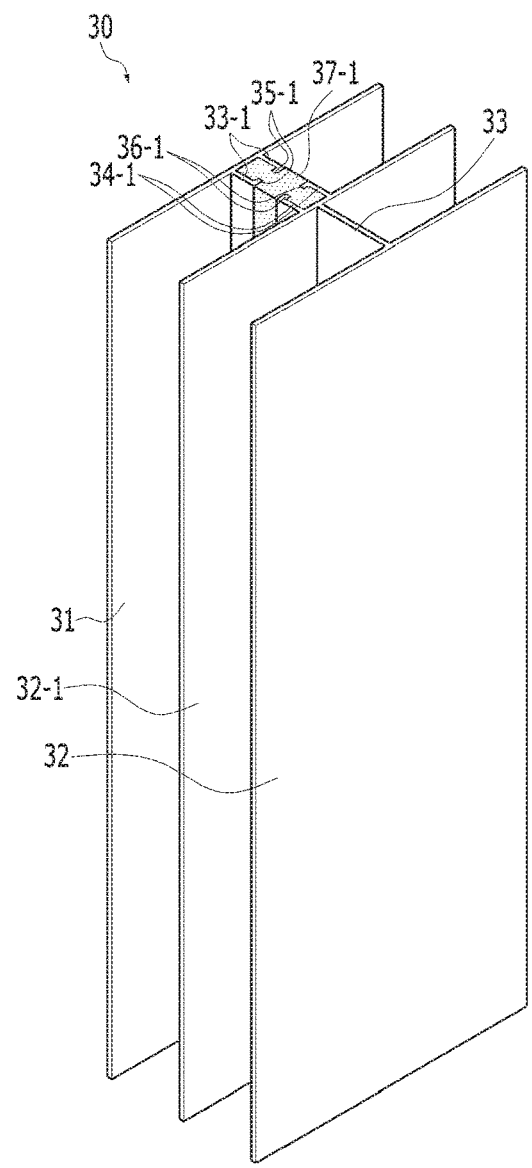
FIG. 18 is a perspective view of a longitudinal member of a vacuum insulation panel providing assembly according to the second embodiment of the present invention.

FIG. 18 is a perspective view of a longitudinal member of the vacuum insulation panel providing assembly according to the second example of the second embodiment of the present invention.

Referring to FIG. 18, the longitudinal member 30 of the vacuum insulation panel providing assembly 10 according to the second example of the second embodiment of the present invention comprises first and second plates 31 and 32 spaced apart from each other by a third plate 32-1 and extending side by side (preferably parallel); a connecting plate 33 connecting the second plate 32 and the third plate 32-1; a pair of first leg plates 33-1 extending side by side (preferably parallel) in a direction perpendicular to the surface of the first plate 31 facing the third plate 32-1; a pair of second leg plates 34-1 extending side by side (preferably parallel) in a direction perpendicular to the surface of the third plate 32-1 facing the first plate 31; and insulating block 37-1 positioned between the pair of first leg plates 33-1 and the pair of second leg plates 34-1 to separate the first plate 31 and the third plate 32-1 from each other.

At this time, the pair of first leg plates 33-1 and the respective ends thereof are provided with first latching protrusions 35-1 protruding toward each other in the direction opposite to each other. Likewise, at each end of the pair of second leg plates 34-1, second latching protrusions 36-1 protruding inwardly, that is, inwardly facing each other are formed. Further, since the insulating block 37-1 is manufactured by injection molding a polyurethane resin liquid, the insulating block 37-1 is excellent in heat insulation and rigidity.

According to the longitudinal member 30 of the vacuum insulation panel providing assembly 10 according to the second embodiment of the present invention, since the first plate 31 and the third plate 32-1 are spatially separated by the insulating block 37-1 made of a polyurethane resin having excellent heat insulation property, the heat transfer from the first plate 31 to the third plate 32-1 may be blocked mostly. Therefore, when the vacuum insulation panel is installed by using the longitudinal member 30 of the vacuum insulation panel providing assembly 10 according to another embodiment of the present invention, the heat insulation performance can be further improved.

Further, since the insulating block 37-1 made by polyurethane resin is not only excellent in rigidity but also can be firmly fixed by the first and second latching projections 35-1 and 36-1, the insulating block 37-1 can more support stably the vacuum insulation panel.

Figure 19:
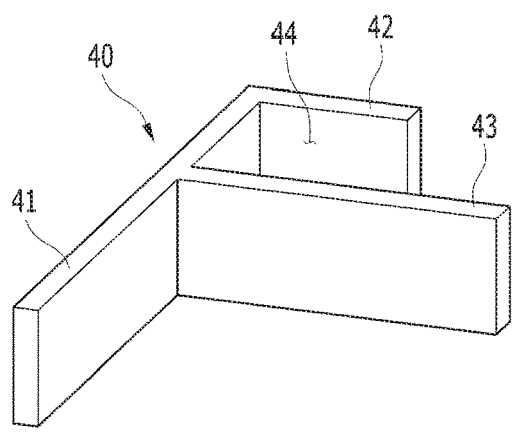
FIG. 19 is a perspective view of a corner member of a vacuum insulation panel providing assembly according to the second embodiment of the present invention.

FIG. 19 is a perspective view of a corner member of the vacuum insulation panel providing assembly according to the second embodiment of the present invention.

Referring to FIG. 19, the corner member 40 comprises a base plate 41 and first and second cantilever plates 42 and 43 extending in a direction perpendicular to the base plate 41. Accordingly, the corner member 40 has an approximately 'F'-shaped cross section.

One end of the vacuum insulation panel may be installed by fitting it into the fitting space 44 between the first cantilever plate 42 and the second cantilever plate 43. The corner members 40 may be installed by fixing them at equal intervals in the vertical direction by four fasteners such as nails and bolts for each inner corner C of the building. Accordingly, the set of four vacuum insulation panels 60-1, 60-2, 60-3 and 60-4 may be installed by fitting them into the fitting spaces 44 of the four corner members 40, respectively. In the present embodiment, four corner members 40 are installed by fixing them at each inner corner C of the building. However, the present invention is not limited thereto, and it is possible to install less than or equal to three (3), or more than or equal to five (5).

Figure 20:
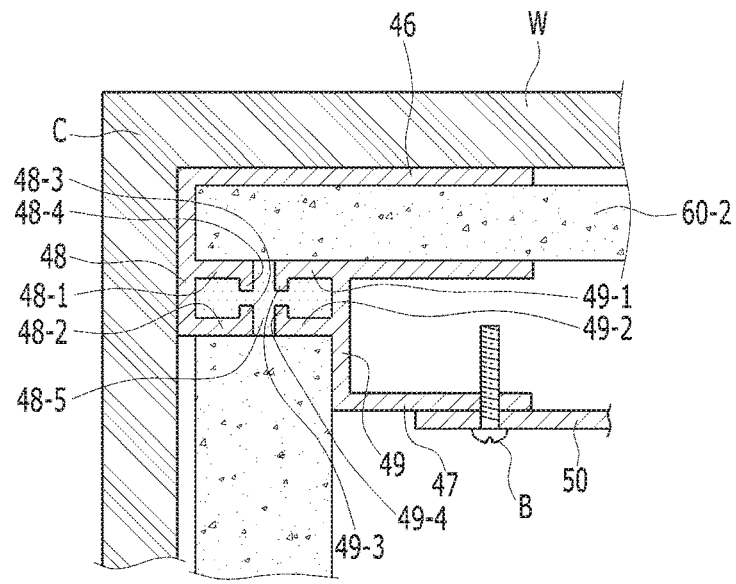
FIG. 20 is a perspective view of a corner member of a vacuum insulation panel providing assembly according to the second example of the second embodiment of the present invention.

FIG. 20 is a perspective view showing a corner member of a vacuum insulation panel providing assembly according to the second example of the second embodiment of the present invention.

Referring to FIG. 20, the corner member comprises a fourth plate; a pair of third plates 48-1, 48-2 extending spaced apart from each other in a direction parallel to the fourth plate; a second connecting plate 48 connecting an end of the fourth plate 46 and each end of the pair of third leg plates 48-1, 48-2; a fifth plate 47 extending in a direction parallel to the fourth plate 46; a pair of fourth leg plates 49-1, 49-2 spaced apart from each other in a direction parallel to the fourth plate 46; a third connecting plate 49 connecting the end of the fifth plate 47 and each end of the pair of fourth leg plates 49-1, 49-2; and a second insulating block 48-5 positioned between the pair of third leg plates 48-1, 48-2 and the pair of fourth leg plates 49-1, 49-2 to block heat transfer from the fourth plate 46 to the fifth plate 47 by separating the fourth plate 46 and the fifth plate 47 from each other.

At this time, Third latching protrusions 48-3, 48-4 protruding in a direction in which the pair of third leg plates 48-1, 48-2 face each other may be formed at the other end of each of the pair of third leg plates 48-1, 48-2. Forth latching protrusions 49-3, 49-4 protruding in a direction in which the pair of fourth leg plates 49-1, 49-2 face each other may be formed at each of the other ends of the pair of fourth leg plates 49-1, 49-2.

According to corner member 40, the vacuum insulation panel may be installed easily by fitting it into the space defined by the fourth plate 46, the second connecting plate 48, and the insulating block 48-5. And another vacuum insulation panel may be installed easily by fitting it into the space defined by the third connecting plate 49 and the insulating block 48-5. Further, the interior material 50 may be firmly fixed to the fifth plate 47 by a fastening member such as a bolt B or the like.

According to the corner member 40 of the vacuum insulation panel providing assembly 10 according to the second embodiment of the present invention, since the fourth plate 46 and the fifth plate 47 are spatially separated by the insulating block 48-5 made of polyamide resin having excellent heat insulation property, most of the heat transfer from the fourth plate 46 to the fifth plate 47 can be blocked. Therefore, if the vacuum insulation panel is installed by using the corner member 40 of the vacuum insulation panel providing assembly 10 according to another embodiment of the present invention, the heat insulation performance can be further improved.

In addition, since the insulating block 48-5 made of a polyimide resin is not only excellent in rigidity but also may be firmly fixed by the third and fourth latching protrusions, the vacuum insulation panel can be more supported stably.

Figure 21:
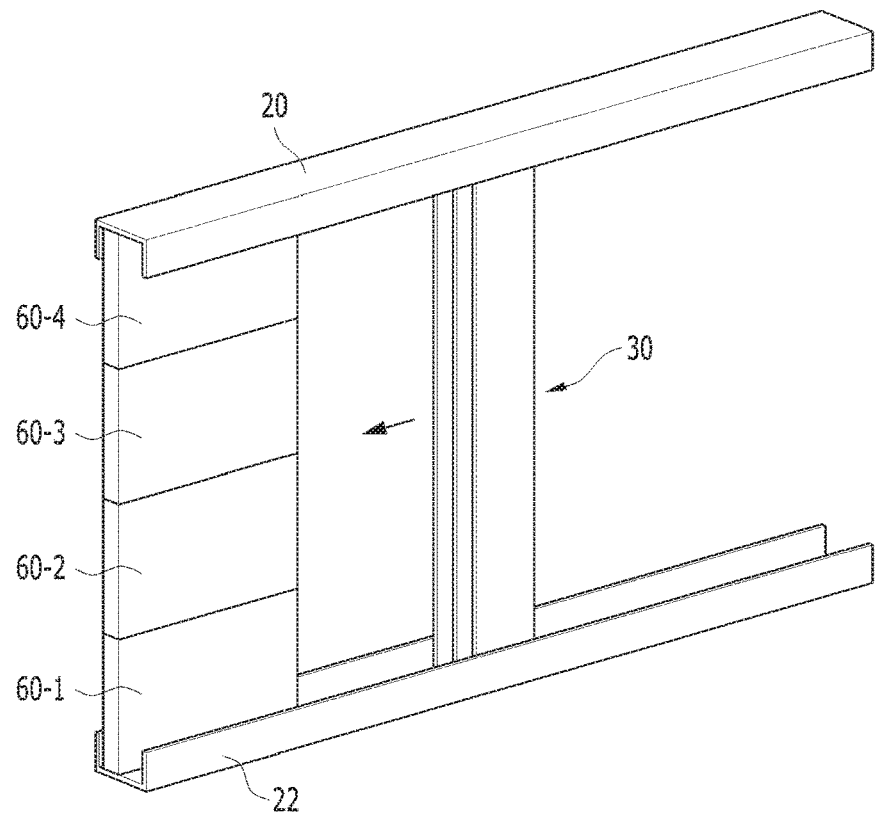
FIG. 21 is a view of a process of collectively installing a plurality of vacuum insulation panels as a set by using a vacuum insulation panel providing assembly according to the second embodiment of the present invention.

FIG. 21 is a view of a process of collectively installing a plurality of vacuum insulation panels as a set by using a vacuum insulation panel providing assembly according to the second embodiment of the present invention.

As shown in FIG. 21, the upper and lower guide members 20 and 22 support slidably both ends of the longitudinal member 30 to guide the longitudinal member 30 to slide along the longitudinal direction of the guide members 20, 22.

The builder may install one end of each of four vacuum insulation panels 60-1, 60-2, 60-3 and 60-4 of set by fitting them into the fitting space 44 of the four corner members 40. Thereafter, the vertical member 30 is slid in the direction of the arrow in FIG. 8, and the other ends of the vacuum insulation panels 60-1, 60-2, 60-3 and 60-4 of set may be installed by fitting them into the first clamping opening 36 of the longitudinal member 30. Accordingly, the builder can collectively install the four vacuum insulation panels on the inner side wall W of the building by each set.

Vacuum Insulation Panel Providing Method According to the Second Embodiment

Now, a vacuum insulation panel providing method will be described in detail with reference to a flowchart of the vacuum insulation panel providing method shown in FIG. 22.

Figure 22:
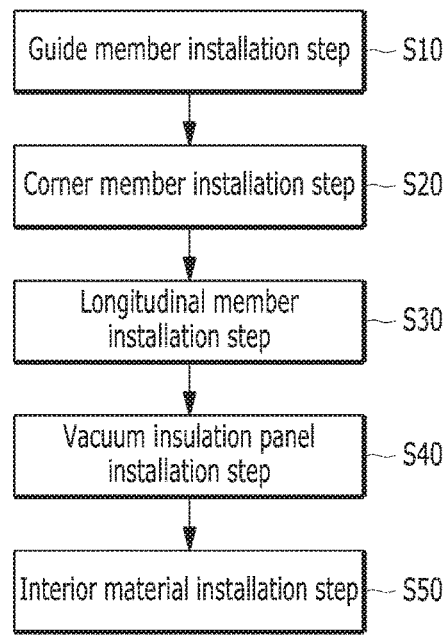
FIG. 22 is a flowchart of vacuum insulation panel providing method of installing a vacuum insulation panel using a vacuum insulation panel providing assembly according to the second embodiment of the present invention.

Referring to FIG. 22, the vacuum insulation panel providing method according to the present invention includes a guide member installation step S10, a corner member installation step S20, a vertical member installation step S30, vacuum insulation panel installation step S40, and an interior material installation step S50.

The guide member installation step S10 is a step of fixing the bar-shaped upper and lower guide members 20 and 22 having a '⊏'-shaped cross section by using a fasteners such as nails or a bolts, and positioning the guide members 20, 22 on the upper and lower corners of the building.

The corner member installation step S20 is a step of fixedly installing the base plate 41 and the corner member 40 having an 'F'-shaped cross section including first and second cantilever plates 42 and 43 extending in a direction perpendicular to the base plate 41 by using fasteners such as nails and bolts and positioning them at the inner corner C of the building. At this time, the plurality of corner members 40 may be installed on the inner corner C of the building at equal intervals in the vertical direction.

The longitudinal member installation step S30 is a step of installing the first and second plates 31 and 32 extending in the vertical direction, and the connecting plate 33 connecting the first plate 31 and the second plate 32, and at least one longitudinal member 30 having a '干'-shaped cross section including the first and second partition plates 34 and 35 extending from both sides of the connecting plate 33 toward the outside in the width direction of the first and second plates 31 and 32, so as to erect vertically between the upper and lower guide member 20 and 22. Specifically, the longitudinal member 30 may be installed between the upper and lower guide members 20 and 22 in a state of being tilted by a predetermined angle and then vertically rising, and can be guided slidably along its longitudinal direction by the upper and lower guide members 20 and 22.

The vacuum insulation panel installation step S40 is a step of installing one end of each of the four vacuum insulation panels 60-1, 60-2, 60-3 and 60-4 of the set by fitting them into the fitting spaces 44 of the four corner members 40, then sliding the longitudinal member 30 along the longitudinal direction of the guide members 20 and 22, installing the other ends of the set of vacuum insulation panels 60-1, 60-2, 60-3 and 60-4 by fitting them into the first fitting space 36 of the longitudinal member 30, collectively installing four vacuum insulation panels as a set. The vacuum insulation panel installation step S40 includes a series of subsequent processes of installing one end of the vacuum insulation panels 61-1, 62-2, 63-3, 64-4 of the other set by fitting them into the second fitting space 36 of the longitudinal member 30, sliding the other longitudinal member 30 along the longitudinal direction of the guide members 20 and 22, installing the other end of the other set of vacuum insulation panels 61-1, 62-2, 63-3, 64-4 by fitting them into the first fitting space 36 of the other longitudinal member 30. After the vacuum insulation panel installation step S40, in order to reduce the heat loss from the gap between the plurality of vacuum insulation panels 60-1, 60-2, 60-3, 60-4, 61-1, 61-2, 61-3 and 61-4, a step of sealing with an insulating tape may be further performed. According to the vacuum insulation panel installation step S40 of the present invention, since the plurality of vacuum insulation panels may be assembled integrally for each set by using the longitudinal member 30, the vacuum insulation panel assembling can be completed quickly.

The interior material step S50 is a step of fastening the interior materials (e.g., gypsum boards) 50, 51 to the second plate 32 of the longitudinal member 30 by using fastening members 52, 53 such as nails or bolts. The longitudinal member 30 according to the present invention can prevent the vacuum insulation panel from being damaged by the fastening members 52, 53 because the accommodating spaces 38, 39 for accommodating the fastening members 52, 53 are partitioned by the partition members 34 and 35.

According to the vacuum insulation panel installation method using the vacuum insulation panel providing assembly of the present invention, the plurality of vacuum insulation panels may be quickly and uniformly installed on the inner side wall of the building without breakage, so that the construction time of the vacuum insulation panel can be shortened.

Vacuum Insulation Panel Providing Assembly of the Third Embodiment

Figure 23:
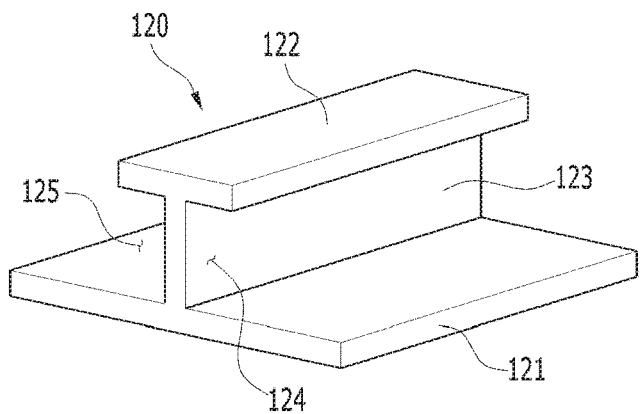
FIG. 23 is a perspective view of a vacuum insulation panel mounting bracket according to the first example of the third embodiment of the present invention.

Referring to FIG. 23, a vacuum insulation panel mounting bracket 120 according to the third embodiment of the present invention comprises a first plate 121; a second plate 122 opposed to and preferably parallel to the first plate 121; and the second plate 122 connecting the first plate 121 and the second plate 122.

The first plate 121 is a component fixed to the outer wall surface of the building. The first plate 121 supports the first surface of the vacuum insulation panel 60 (i.e., the surface adjacent to the outer wall side) while forming a gap between the vacuum insulation panel 60 and the outer wall of the building. Such a gap may prevents the vacuum insulation panel 60 from directly contacting the outer wall of the building. Accordingly, it is possible to prevent the vacuum insulation panel 60 from being damaged during the process of installing the vacuum insulation panel 60, thereby preventing the occurrence of vacuum breakage.

The second plate 122 is a component that supports the second surface (i.e., the surface adjacent to the finishing material side) of the vacuum insulation panel 60. The second plate 122 is parallel to the first plate 121 and is spaced apart from the first plate 121 by a predetermined distance (approximately the distance corresponding to the thickness of the vacuum insulation).

The connecting plate 123 is a component connecting the first and second plates 121 and 122. Therefore, the vacuum insulation panel mounting bracket 20 is divided into two spaces 124 and 125 having an approximately 'I'-shaped cross section. Specifically, a first fitting space 124 for supporting one end of the optional vacuum insulation panel 60 and a second fitting space 125 for supporting one end of another adjacent vacuum insulation panel 60 are provided on the connecting plate 123, respectively.

Figure 24:
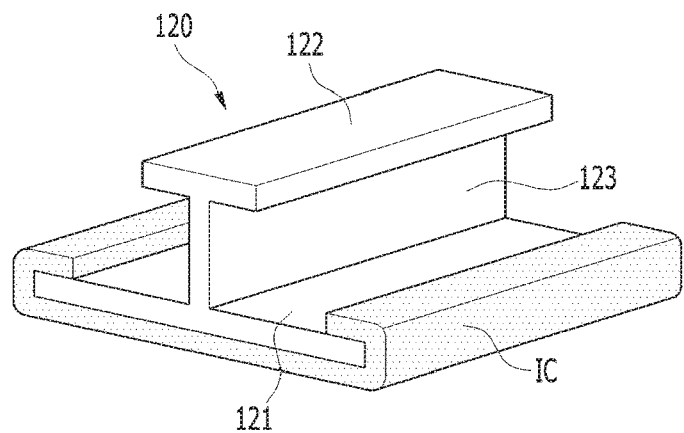
FIG. 24 is a perspective view of a state in which an insulating cover is attached to a vacuum insulation panel mounting bracket illustrated in FIG. 23.

FIG. 24 is a view of a state in which an insulating cover is attached to the vacuum insulation panel mounting bracket shown in FIG. 23. Referring to FIG. 24, the insulating cover IC is a component attached to surround the first plate 121 of the vacuum insulation panel mounting bracket 120, and the material thereof is made of thermoplastic elastomer (TPE). Such an insulating cover (IC) can block mostly the heat transfer from the vacuum insulation panel mounting bracket 120 to the inside of the building. Therefore, when the vacuum insulation panel is installed by using the vacuum insulation panel mounting bracket 120, the heat insulation performance can be further improved.

Figure 25:
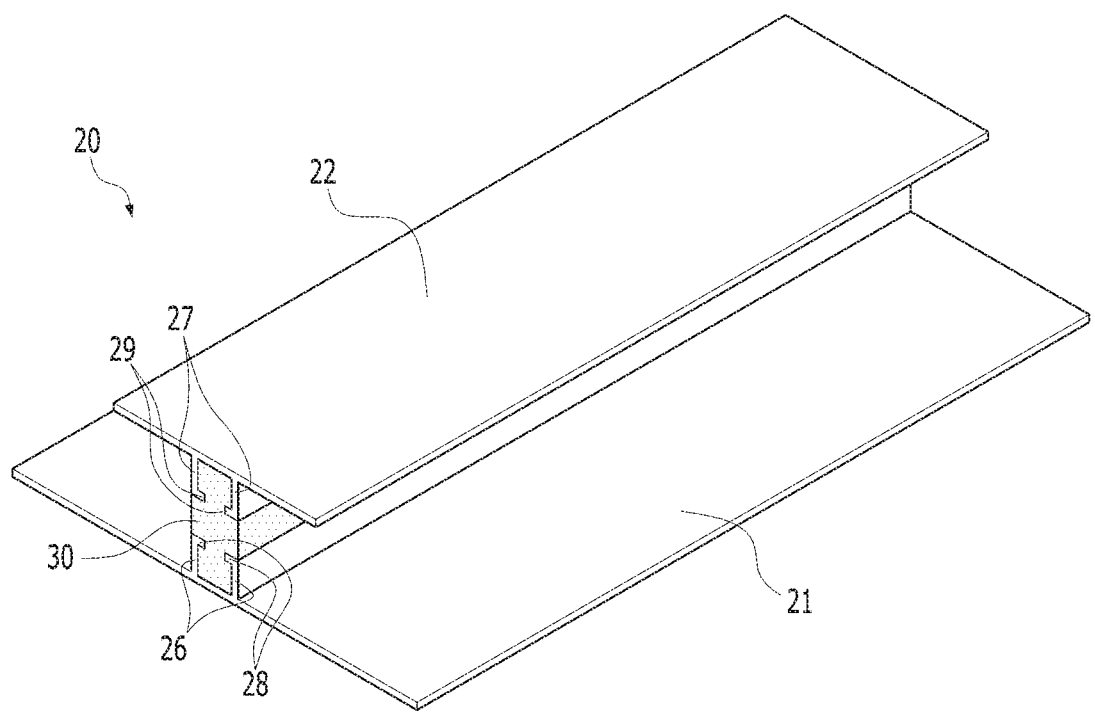
FIG. 25 is a perspective view of a vacuum insulation panel mounting bracket according to the second example of the third embodiment of the present invention.

FIG. 25 is a perspective view of a vacuum insulation panel mounting bracket according to the second example of the third embodiment of the present invention.

Referring to FIG. 25, the vacuum insulation panel mounting bracket comprises a first plate 21; a pair of first leg plates 26 extending side by side (preferably parallel) to each other in a direction perpendicular to the surface of the first plate 21 facing the second plate 22; a pair of second leg plates 27 extending in parallel in a direction perpendicular to the surface of the second plate 22 facing the first plate 21; and insulating block 30 positioned between the pair of first leg plates 26 and the pair of second leg plates 27 separating the first plate 24 and the second plate 22 from each other.

At this time, on each end of the pair of first leg plates 26, first latching protrusions 28. in the directions opposite to each other, i.e., inwardly are formed. Likewise, at each end of the pair of second leg plates 27, second latching protrusions 29 are formed which protrude in the directions opposite to each other, i.e., inwardly. Further, since the insulating block 30 is manufactured by injection molding a polyurethane resin solution, the insulating block 30 is excellent in heat insulation and rigidity.

According to the second embodiment of the vacuum insulation panel mounting bracket 20 according to the third embodiment of the present invention, the first plate 21 and the second plate 22 are spatially separated from each other by the insulating block 30 made of a polyurethane resin having excellent heat insulation property, most of the heat transfer from the first plate 21 to the second plate 22 can be blocked. Therefore, if the vacuum insulation panel 60 is installed by using the vacuum insulation panel mounting bracket 20 according to another embodiment of the present invention, the heat insulation performance can be further improved.

Further, since the insulating block 30 made of a polyurethane resin is excellent in rigidity and may be firmly fixed by the first and second latching protrusions 28 and 29, it is possible to more support stably the vacuum insulation panel.

Figure 26:
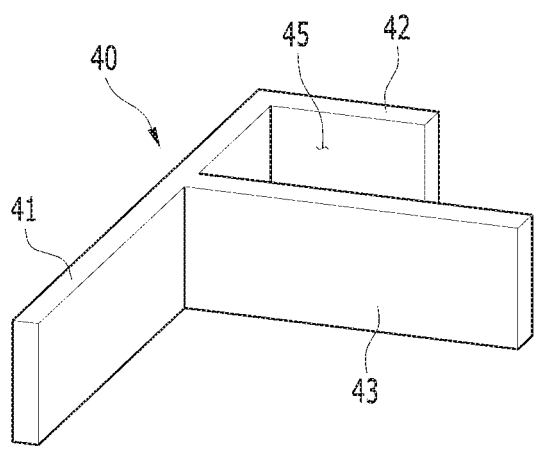
FIG. 26 is a perspective view of a vacuum insulation panel mounting corner member according to the third embodiment of the present invention.

FIG. 26 is a perspective view of a vacuum insulation panel mounting corner member according to the third embodiment of the present invention.

Referring to FIG. 26, the vacuum insulation panel mounting corner member 40 according to the third embodiment of the present invention comprises a base plate 41; first and second cantilevers 41; and 42 extending in a direction perpendicular to the base plate 41.

Therefore, the vacuum insulation panel mounting corner member 40 has an approximately IF-shaped cross section. The first cantilever plate 42 extends in a direction perpendicular to one end of the base plate 41. The second cantilever plate 43 extends side by side (preferably parallel) to the first cantilever plate 42 and is spaced from the first cantilever plate 42 by a distance corresponding to the thickness of the vacuum insulation panel. At this time, the second cantilever plate 43 may be provided with a fastening portion 44 extends more in the direction perpendicular to the base plate 41. Therefore, one end of the vacuum insulation panel may be installed by fitting them into the fitting space 45 between the first cantilever plate 42 and the second cantilever plate 43 and supported. One end of the other vacuum insulation panel may be supported by the right-angled side surface of the base plate 41 and the second cantilever plate 43.

Figure 27:
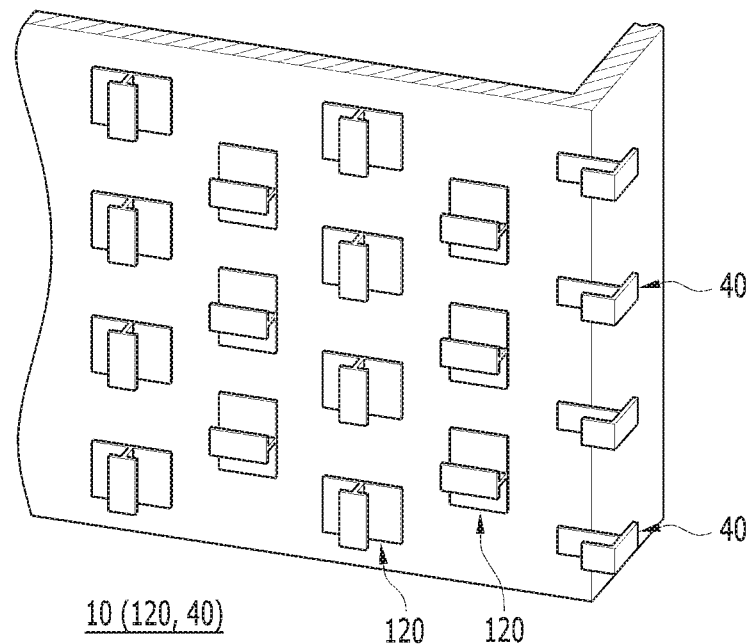
FIG. 27 is a view of a state in which a vacuum insulation panel mounting bracket and a corner member according to the third embodiment of the present invention are fixed to an outer wall surface of a building.
Figure 28:
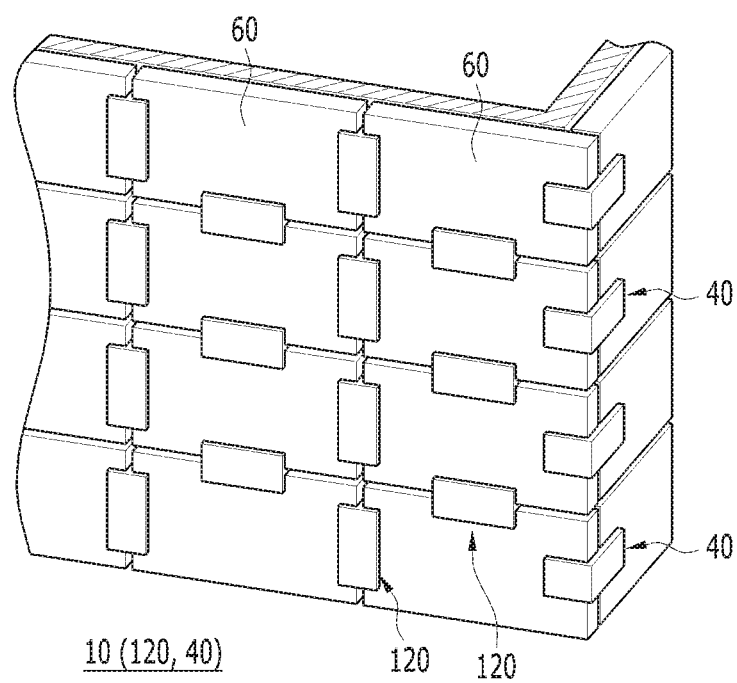
FIG. 28 is a view of a state in which a vacuum insulation panel is installed by using the vacuum insulation panel providing assembly according to the third embodiment of the present invention.
Figure 29:
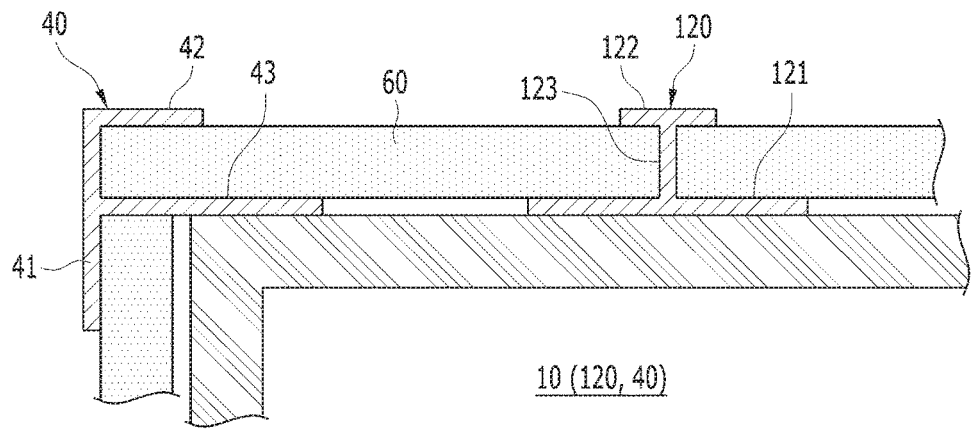
FIG. 29 is a cross-sectional view of a state in which a vacuum insulation panel is installed by using a vacuum insulation panel providing assembly according to the third embodiment of the present invention.
Figure 30:
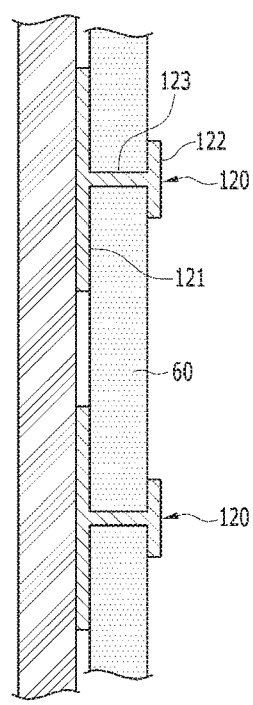
FIG. 30 is a longitudinal sectional view of a state in which a vacuum insulation panel is installed by using a vacuum insulation panel providing assembly according to the third embodiment of the present invention.

FIG. 27 is a view of a state in which a vacuum insulation panel mounting bracket and the corner member according to the third embodiment of the present invention are fixed to an outer wall surface of a building. FIG. 28 is a view of a state in which a vacuum insulation panel is installed by using the vacuum insulation panel providing assembly according to the third embodiment of the present invention. FIG. 29 is a cross-sectional view of a state in which a vacuum insulation panel is installed by using a vacuum insulation panel providing assembly according to the third embodiment of the present invention. FIG. 30 is a longitudinal sectional view of a state in which a vacuum insulation panel is installed by using a vacuum insulation panel providing assembly according to the third embodiment of the present invention.

Referring to FIGS. 27 to 30, the process of installing the standardized mass-product vacuum insulation panel (that is, a vacuum insulation panel that is mass produced in accordance with a predetermined standard of vacuum degree, material, thickness, width, length, etc.) on the outer wall of the building by using the vacuum insulation panel providing assembly 10 of the present invention will be described in detail.

As shown in FIG. 27, the vacuum insulation panel mounting corner members 40 are fixed at equal intervals to each other at four corners of the building in the vertical direction. Specifically, the vacuum insulation panel mounting corner member 40 may be fixed by positioning the fastening portion 44 of the second cantilever plate 43 at the outer corner of the building and then by fastening by using a fastening member such as a nail or a bolt.

As shown in FIG. 27, the vacuum insulation panel mounting bracket 120 may be fixed to the outer wall surface of the building so as to be positioned at the edge of the standardized vacuum insulation panel 60. Specifically, the vacuum insulating mounting bracket 120 may be fixed by positioning the first plate 121 on the outer wall surface of the building and fastened by using a fastening member such as a nail or a bolt. In this case, it is needless to say that the fixation attachment position of the vacuum insulation panel mounting bracket 120 and the corner member 40 according to the third embodiment of the present invention can be performed by a general method by using diapers or the like.

As shown in FIGS. 28 and 29, the plurality of vacuum insulation panels 60 can be installed on the outer wall surface of the building by the vacuum insulation panel mounting bracket 120 and the corner member 40. Specifically, the vacuum insulation panel 60 positioned at the outer corner of the building may be supported by fitting the corner side end of the vacuum insulation panel 60 into the fitting space 45 of the vacuum insulation panel installing corner member 40. And the other end thereof may be installed by fitting it into any one of the first and second fitting spaces of the vacuum insulation panel mounting bracket 120, and supported.

Therefore, according to the vacuum insulation panel providing assembly 10 of the third embodiment of the present invention, the corner end of the vacuum insulation panel located at the outer corner of the building among the plurality of vacuum insulation panels is installed by fitting it by the vacuum insulation panel mounting corner member 40. And at least one of the other vacuum insulation panel is installed by fitting it by using the vacuum insulation panel mounting bracket 120, so that a plurality of vacuum insulation panels can be installed easily on the outer wall of the building without breakage.

Figure 31:
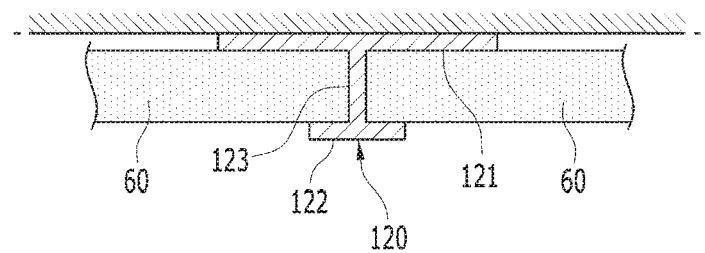
FIG. 31 is a sectional view of a state in which a vacuum insulation panel mounting bracket according to the third embodiment of the present invention is installed on the ceiling slab of a building.

FIG. 31 is a sectional view of a state in which the vacuum insulation panel mounting bracket according to the third embodiment of the present invention is installed on the ceiling slab of the building. As shown in FIG. 31, the vacuum insulation panel mounting bracket 120 according to the present invention may be used for installing the vacuum insulation panel on the ceiling of the building.

Referring to FIG. 31, the vacuum insulation panel mounting bracket 120 may be fixed to the ceiling slab of the building by fastening the first plate 121 by using a fastening member such as a nail or a bolt. Thereafter, the vacuum insulation panel is fitted to the first and second spaces so that the vacuum insulation panel can be installed on the ceiling slab of the building. As described above, the vacuum insulation panel mounting bracket 120 according to the present invention may be used not only for the outer wall of the building but also for installing the vacuum insulation panel on the ceiling of the building.

Dryvit Construction Method of Third Embodiment

Figure 32:
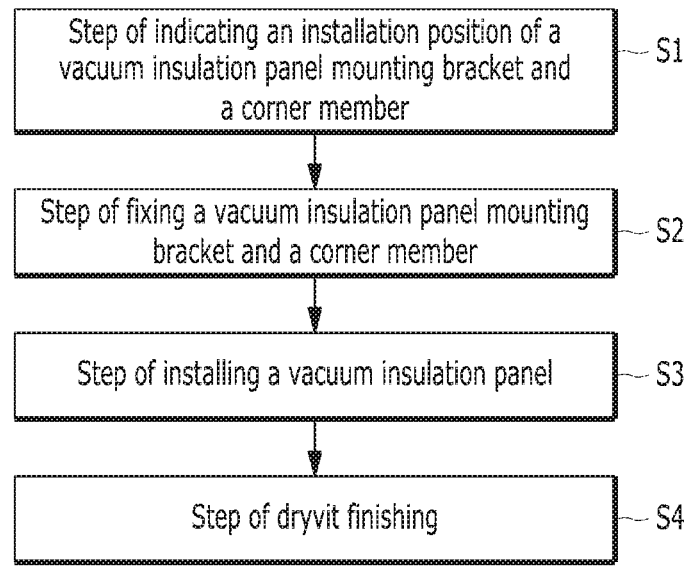
FIG. 32 is a process diagram for explaining a method of performing dryvit construction using the vacuum insulation panel providing assembly according to the third embodiment of the present invention

Now, a dryvit construction method using a vacuum insulation panel providing assembly will be described with reference to a process diagram for dryvit construction shown in FIG. 32.

The drybit construction method according to the present invention includes the step Si of indicating an installation position of the vacuum insulation panel mounting bracket and the corner member; the step 52 of fixing the vacuum insulation panel mounting bracket and the corner member; the step 53 of installing the vacuum insulation panel; and the step S4 of the dryvit finishing.

The step S1 of indicating the installation position of the vacuum insulation panel mounting bracket and the corner member is the step of indicating installation position of the vacuum insulation panel mounting bracket 120 and the corner member 40 in consideration of the standard of vacuum insulation panel. Such an installation position may be displayed by a general method by using an inking line or the like. Specifically, the vacuum insulation panel mounting bracket 120 is positioned on the outer wall of the building so as to support one end of the two neighboring vacuum insulation panels. And the vacuum insulation panel installation corner member 40 is positioned at the outer corner of the building so as to support the corner side end of the vacuum insulation panel.

The step S2 of fixing the vacuum insulation panel mounting bracket and the corner member is a step of fixing the vacuum insulation panel mounting bracket 120 to the outer wall surface of the building and fixing the vacuum insulation panel mounting corner member 40 to the outer corner of the building. Specifically, the vacuum insulation panel mounting bracket 120 may be fixed by positioning the first plate 121 on the positioned outer wall surface and then fastening member such as a nail or a bolt. And the vacuum insulation panel mounting corner member 40 may be fixed by positioning the fastening portion 44 of the second cantilever plate 43 on the positioned outer corner and fastening by using a fastening member such as a nail or a bolt.

The step S3 of installing the vacuum insulation panel is the step of installing a plurality of vacuum insulation panels 60 on the outer wall of the building by using the vacuum insulation panel providing assembly 10. Specifically, the vacuum insulation panel positioned at the outer corner of the building may be fitted with the corner side part of the vacuum insulation panel 60 in the fitting space 45 of the vacuum insulation panel mounting corner member 40. And the ends of the two neighboring vacuum insulation panels 60 may be installed by fitting them into the first and second fitting spaces of the vacuum insulation panel mounting bracket 120. As a result, it can be installed on the outer wall of the building without breakage.

The dryvit finishing step S4 includes an adhesive mortar local application step, a mesh net attachment step, an adhesive mortar whole application step, and a dryvit finish application step.

The adhesive mortar local application step is a step of locally applying the mortar so as to individually cover the second plate 122 and the first cantilever plate 42 which are exposed to the outside after installing the vacuum insulation panel.

The mesh net attachment step is a step of attaching the mesh net to the adhesive mortar locally attached to the second plate 122 and the first cantilever plate 42. At this time, the mesh net is attached for the purpose of preventing cracking an impact is reinforcement, and a glass fiber net having excellent tensile strength is mainly adopted.

The adhesive mortar whole application step is a step of evenly applying the adhesive mortar as a whole. At this time, the entire application step of the adhesive mortar must be performed after the locally applied adhesive mortar has been completely dried. If the adhesive mortar local application step is omitted or the adhesive mortar whole application step is performed before the locally applied adhesive mortar is completely dried, the parts of the exposed plates 122, 42 are projected outwardly, thereby deteriorating the overall external aesthetics of the building. Thus, the whole application of the adhesive mortar should be performed after the locally applied adhesive mortar has been completely dried.

The dryvit finish application step is a step of applying the final finishing material by using a trowel, a spray gun, a roller and a brush, etc., and may implement various colors and patterns.

The preferred embodiments of the present invention have been described above with reference to the accompanying drawings. However, the present invention is not limited thereto and can be changed or modified within the scope of the present invention. Therefore, the scope of the present invention should not be limited to the above-described embodiments, but should be defined by the claims equivalent to the claims of the present invention as well as the claims of the following.

What is claimed is:

1. A vacuum insulation panel providing assembly for installing a vacuum insulation panel on an outer side wall of a building,
   wherein the vacuum insulation panel providing assembly comprises a vacuum insulation panel mounting bracket which receives a single vacuum insulation panel, the vacuum insulation panel mounting bracket comprising:
   a semicircular outer wall side plate having a first side and a second side opposite the first side, the first side supporting a first surface of the single vacuum insulation panel;
   a semicircular exterior material side plate having a first side and a second side opposite the first side, the first side supporting a second surface of the single vacuum insulation panel; and
   a connection for connecting the outer wall side plate and a straight end of the exterior material side plate from the second side of the semicircular outer wall side plate to the second side of the semicircular exterior material side plate,
   wherein the connection comprises a mounting groove extending from the second side of the semicircular outer wall side plate to the second side of the semicircular exterior material side plate.

2. The vacuum insulation panel providing assembly according to claim 1, wherein the vacuum insulation panel providing assembly further comprises a corner member positioned on a corner, an outer corner or a window edge of the building,
   wherein the corner member comprises a base plate, a first cantilever plate extending from one end of the base plate in a perpendicular direction, and a second cantilever plate extending in a direction parallel to the first cantilever plate from an intermediate point of the base plate.

* * * * *